(12) United States Patent
Myers et al.

(10) Patent No.: US 8,301,696 B2
(45) Date of Patent: *Oct. 30, 2012

(54) METHODS AND SYSTEMS FOR SCALABLE VIDEO DELIVERY

(75) Inventors: Robert Linwood Myers, Mississauga (CA); Scott Ernest Aitchison, Oakville (CA); Gregory Scott Murray, Toronto (CA)

(73) Assignee: Seawell Networks Inc., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/445,285

(22) Filed: Apr. 12, 2012

(65) Prior Publication Data

US 2012/0203868 A1 Aug. 9, 2012

Related U.S. Application Data

(63) Continuation of application No. 12/842,515, filed on Jul. 23, 2010, now Pat. No. 8,190,677.

(51) Int. Cl.
*G06F 15/16* (2006.01)
(52) U.S. Cl. .......................... 709/203; 709/231
(58) Field of Classification Search .......... 709/203–207, 709/220, 229–232, 245–247
See application file for complete search history.

(56) References Cited

U.S. PATENT DOCUMENTS

| | | | | |
|---|---|---|---|---|
| 5,920,865 A * | 7/1999 | Ariga | | 1/1 |
| 5,978,843 A * | 11/1999 | Wu et al. | | 709/219 |
| 6,240,243 B1 * | 5/2001 | Chen et al. | | 386/344 |
| 6,279,040 B1 * | 8/2001 | Ma et al. | | 709/231 |
| 6,529,996 B1 * | 3/2003 | Nguyen et al. | | 711/114 |
| 7,028,096 B1 * | 4/2006 | Lee | | 709/231 |
| 7,143,170 B2 * | 11/2006 | Swildens et al. | | 709/226 |
| 7,194,000 B2 * | 3/2007 | Balachandran et al. | | 370/395.42 |
| 7,359,985 B2 * | 4/2008 | Grove et al. | | 709/238 |
| 7,369,610 B2 * | 5/2008 | Xu et al. | | 375/240.08 |
| 7,376,716 B2 * | 5/2008 | Dilley et al. | | 709/219 |
| 7,392,325 B2 * | 6/2008 | Grove et al. | | 709/238 |
| 7,536,469 B2 * | 5/2009 | Chou et al. | | 709/231 |
| 7,536,470 B2 * | 5/2009 | Li et al. | | 709/231 |
| 7,543,073 B2 * | 6/2009 | Chou et al. | | 709/231 |
| 7,734,730 B2 | 6/2010 | McCanne | | |
| 8,190,677 B2 | 5/2012 | Myers et al. | | |

(Continued)

OTHER PUBLICATIONS

Co-pending U.S. Appl. No. 12/400,306, "Progressive Download Gateway", filed Mar. 9, 2009.

(Continued)

*Primary Examiner* — Moustafa M Meky
*Assistant Examiner* — Sargon Nano
(74) *Attorney, Agent, or Firm* — Bereskin & Parr LLP/S.E.N.C.R.L., s.r.l.

(57) ABSTRACT

Methods and systems for delivering scalable media content from a server to a client are provided. A server index is provided to a media server for indexing the layers of scalable content in the form of media data groups. The client transmits at least one media request comprising a scalable media presentation identifier, a requested quality identifier and a requested layer identifier. Based on the at least one request, the server identifies the requested media data groups and transmits the requested media data groups to the client. The client receives the requested media data groups, which may be a subset of all available media data groups, and reorders the media data into decoding order for subsequent decoding and playback.

12 Claims, 7 Drawing Sheets

U.S. PATENT DOCUMENTS

| | | | |
|---|---|---|---|
| 8,218,628 B2* | 7/2012 | Schwarz et al. | 375/240.1 |
| 2002/0140851 A1* | 10/2002 | Laksono | 348/388.1 |
| 2003/0195977 A1* | 10/2003 | Liu et al. | 709/231 |
| 2004/0202320 A1* | 10/2004 | Amini et al. | 380/36 |
| 2005/0163224 A1* | 7/2005 | Shin et al. | 375/240.25 |
| 2006/0083308 A1* | 4/2006 | Schwarz et al. | 375/240.16 |
| 2006/0083309 A1* | 4/2006 | Schwarz et al. | 375/240.16 |
| 2006/0143678 A1* | 6/2006 | Chou et al. | 725/118 |
| 2006/0165166 A1* | 7/2006 | Chou et al. | 375/240.05 |
| 2006/0248216 A1* | 11/2006 | Park | 709/231 |
| 2007/0022215 A1* | 1/2007 | Singer et al. | 709/246 |
| 2007/0118618 A1 | 5/2007 | Kisel et al. | |
| 2007/0121723 A1* | 5/2007 | Mathew et al. | 375/240.12 |
| 2007/0165524 A1* | 7/2007 | Mascolo | 370/230 |
| 2007/0201549 A1* | 8/2007 | Hannuksela et al. | 375/240.01 |
| 2007/0263087 A1* | 11/2007 | Hong et al. | 348/14.13 |
| 2007/0268362 A1* | 11/2007 | West et al. | 348/14.15 |
| 2007/0276954 A1* | 11/2007 | Chan et al. | 709/231 |
| 2007/0291837 A1* | 12/2007 | Eleftheriadis | 375/240.02 |
| 2008/0095230 A1* | 4/2008 | Hannuksela et al. | 375/240.02 |
| 2008/0120424 A1* | 5/2008 | Deshpande | 709/230 |
| 2008/0130658 A1* | 6/2008 | Chakareski et al. | 370/395.42 |
| 2008/0211901 A1 | 9/2008 | Civanlar et al. | |
| 2008/0239062 A1 | 10/2008 | Civanlar et al. | |
| 2008/0247460 A1 | 10/2008 | Kang et al. | |
| 2009/0013083 A9 | 1/2009 | Garcia-Luna-Aceves et al. | |
| 2009/0016434 A1 | 1/2009 | Amonou et al. | |
| 2009/0031021 A1 | 1/2009 | Bae et al. | |
| 2009/0119594 A1 | 5/2009 | Hannuksela | |
| 2009/0178091 A1 | 7/2009 | Miyamoto et al. | |
| 2009/0295988 A1 | 12/2009 | Kohno | |
| 2010/0080285 A1* | 4/2010 | Lee et al. | 375/240.02 |
| 2010/0111183 A1* | 5/2010 | Jeon et al. | 375/240.16 |
| 2010/0189182 A1* | 7/2010 | Hannuksela | 375/240.25 |
| 2010/0228862 A1 | 9/2010 | Myers | |
| 2010/0228875 A1 | 9/2010 | Myers | |
| 2011/0013538 A1* | 1/2011 | Henocq et al. | 370/253 |
| 2011/0038421 A1* | 2/2011 | Schwarz et al. | 375/240.16 |
| 2011/0082945 A1 | 4/2011 | Myers et al. | |

OTHER PUBLICATIONS

Jens-Rainer Ohm, "Scalable Video Coding", In: Shenzhen Workshop, RWTH Aachen University, Oct. 2007, Aachen, Germany.

Heiko Schwarz et al., "Overview of the Scalable Video Coding Extension of the H.264/AVC Standard", In: IEEE Transactions on Circuits and Systems for Video Technology, Sep. 2007, vol. 17, No. 9, Berlin, Germany.

United States Office Action Response, U.S. Appl. No. 12/400,270, dated Feb. 17, 2011.

United States Office Action, U.S. Appl. No. 12/400,270, dated Nov. 23, 2010.

Co-pending U.S. Appl. No. 12/400,270, "Multi-Tiered Scalable Media Streaming Systems and Methods", filed Mar. 9, 2009.

United States Office Action, U.S. Appl. No. 12/400,306, dated Feb. 3, 2011.

Co-pending U.S. Appl. No. 12/842,515, "Methods and Systems for Scalable Video Delivery", filed Jul. 23, 2010.

Co-pending U.S. Appl. No. 12/842,474, "Methods and Systems for Scalable Video Chunking", filed Jul. 23, 2010.

ISO/IEC 14496-15:2004 Amd 2:2008, "Information technology—Coding of audio-visual objects—Part 15: Advanced Video Coding (AVC) file format".

United States Office Action Response, U.S. Appl. No. 12/400,306, dated May 3, 2011.

United States Office Action, U.S. Appl. No. 12/400,270, dated Apr. 28, 2011.

United States Office Action, U.S. Appl. No. 12/400,306 dated Jul. 19, 2011.

United States Office Action Response and RCE, U.S. Appl. No. 12/400,306, dated Oct. 17, 2011.

United States Office Action, U.S. Appl. No. 12/400,306, dated Jan. 3, 2012.

United States Office Action Response, U.S. Appl. No. 12/400,306, dated Apr. 2, 2012.

United States Notice of Allowance, U.S. Appl. No. 12/842,515, dated Mar. 5, 2012.

Extended European Search Report dated Nov. 9, 2011 for Application No. 11174626.9-1247.

Alex Zambelli: "IIS Smooth Streaming Technical Overview", Mar. 31, 2009, XP55009366, Retrieved from the Internet: URL: http://img.prodek.lt/documents/IIS_Smooth_Streaming_Technical_Overview; pdf [retrieved on Oct. 12, 2011] the whole document.

Thomas Schierl et al. "Response to CfP on HTTP Streaming of MPEG Media—On Adaptive HTTP Streaming using SVC and MVC", 93. MPEG Meeting; Jul. 26-30, 2010; Geneva; (Motion Picture Expert Group or ISO/IEC JTC1/SC29/WG11) No. M17851, Jul. 22, 2010.

Universal Mobile Telecommunications System (UMTS); Ltd; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route des Lucioles; F06921 Sophia-Antipolis; France, vol. 3GPP SA 4, No. V9.3.0 Jun. 1, 2010, XP014047290, section 12.1, section 12.6.2, p. 109, examples 15 and 16.

Anonymous: "Study of ISO/IEC 14496-10: 2009/DCOR 1", 90. MPEG Meeting; Oct. 26-30, 2009; Xian; (Motion Picture Expert Group or ISO/IEC JTC1/SC29/WG11) No. N10898, Nov. 18, 2009 XP030017397.

Wenger M M Hannuksela T Stockhammer M Westerlund D Singer S: "RTP Payload Format for H.264 Video; rfc3984.txt", 5. JCT-VC Meeting; 96. MPEG Meeting; Mar. 16-23, 2011; Geneva; (Joint Collaborative Team on Video Coding of ISO/IEC JTC1/SC29/WG11AND ITU-T SG. 16); URL: HTTP://WFTP3.ITU.INT/AV-ARCH/JC TVC-SITE/, Internet Engineering Task Force, IETF, CH, Feb. 1, 2005, XP015009755, ISSN: 0000-0003, section 5.5.

Microsoft Corporation: "IIS Smooth Streaming Transport Protocol", Internet Citation, Sep. 8, 2009, pp. 1-55, XP002617721, Retrieved from the Internet: URL: http://www.iis.net/community/files/media/smoothspecs/%5BMS-SMTH%5D.pdf [retrieved on Jan. 21, 2011] section 1.3, section 4.

United States Office Action Response and RCE, U.S. Appl. No. 12/400,270, dated Jul. 8, 2011.

United States Office Action, U.S. Appl. No. 12/400,306, dated Jul. 18, 2012.

United States Office Action, U.S. Appl. No. 12/842,474 dated Jul. 9, 2012.

United States Office Action Response, U.S. Appl. No. 12/842,474 dated Jun. 19, 2012.

* cited by examiner

METHODS AND SYSTEMS FOR SCALABLE VIDEO DELIVERY

CROSS-REFERENCE TO RELATED APPLICATION

This application is a continuation of U.S. patent application Ser. No. 12/842,515, filed on Jul. 23, 2010. The entire contents of U.S. patent application Ser. No. 12/842,515 are hereby incorporated by reference.

FIELD

The described embodiments relate to the field of streaming media, and in particular to streaming of scalable media, such as video and audio.

INTRODUCTION

Video chunking can be described as the process of splitting up a video into a number of chunks or smaller videos, where each chunk represents a specific non-overlapping time block of the video. For example, each chunk may represent five seconds of the video. When a client wants to receive the video it requests the chunks using a standard protocol, such as HTTP (Hypertext Transfer Protocol). The client requests the chunks in the proper order and feeds the data to a decoder to provide a smooth flowing video.

Video chunking has recently been used to implement adaptive streaming of video. Specifically, several versions of a video are created, each representing a different video quality (and thus bandwidth). Each of these files is then split up into a number of chunks or smaller videos. This allows the client to select which chunk to download based on the current available bandwidth and/or the depth of the buffer. For example, the client may select a chunk from the lowest quality version of the video when there is limited bandwidth. When the bandwidth improves or increases the client may then switch to chunks from a higher quality version of the video. In this manner, the video stream can be dynamically adapted to the available bandwidth.

Two exemplary adaptive video chunking implementations are the Move Networks™ implementation and the Microsoft™ implementation. In the Move Networks™ implementation, one file is created for each chunk. Therefore each file represents a specific time frame and a specific bandwidth or quality. One problem with this particular implementation, however, is the large number of files that need to be created and managed. For example, if ten versions of a ten-minute video are created, and each version of the video is divided into two-second chunks, there will be 3000 chunks and thus 3000 separate files.

An exemplary adaptive video chunking implementation is Microsoft Smooth HD™ or Smooth Streaming™. Under this implementation, only one file is created for each bitrate. ISO (International Organization for Standardization) MP4 (Moving Picture Expert Group-4) movie fragments (MOOF) are used to divide each file into chunks. The client then creates a HTTP URL (Uniform Resource Locator) that indicates the time period and the bandwidth (quality level) that it wishes to receive. A Microsoft™ IIS (Internet Information Services) server parses the request and retrieves the correct MOOF from the correct file.

Recently, a new video coding standard, referred to as Scalable Video Coding (SVC) was developed. SVC is an extension of the H.264/MPEG-4 AVC video compression standard. When a video file is SVC encoded, it is encoded into one or more layers, of differing quality. The layer with the lowest quality, referred to as the base layer, contains the most important part of the video stream. One or more enhancement layers may then be encoded to further refine the quality of the base layer. The enhancement layers are used for improving the spatial resolution (picture size), temporal resolution (frame rate), and the SNR (signal to noise ratio) quality of the base layer.

SUMMARY

In one broad aspect, there is provided a method for delivering media content from a server to a client, comprising providing a plurality of network abstraction layer (NAL) units representing a scalable media presentation, each NAL unit being associated with one layer of a plurality of layers; grouping the plurality of NAL units into a plurality of media data groups, each media data group corresponding to only one layer of the plurality of layers for a specific time period of the scalable media presentation; providing a server index comprising a plurality of server index entries, each server index entry corresponding to only one of the plurality of media data groups and comprising a media data group identifier for identifying the corresponding media data group, a quality identifier for identifying a quality level of the corresponding media data group and a layer identifier for identifying the layer associated with the corresponding media data group; receiving at least one media request from the client, the at least one media request comprising a scalable media presentation identifier for identifying the scalable media presentation, a requested quality identifier and a requested layer identifier; and, for each at least one media request, determining a requested index entry in the plurality of server index entries based on the scalable media presentation identifier, the requested quality identifier and the requested layer identifier; identifying a requested media data group based on the media data group identifier of the requested index entry; and transmitting the requested media data group.

In some embodiments, the method may further comprise, prior to receiving the at least one media request, receiving an initial request from the client, and transmitting a client index to the client in response to the initial request, the client index comprising a plurality of client index entries, each client index entry corresponding to only one of the server index entries.

Each client index entry may further comprise metadata for use by a scalable media presentation decoder at the client.

Each of the plurality of NAL units in the specific time period may have a sequence identifier associated therewith for identifying the decoding order of each NAL unit within the plurality of NAL units, and each of the media data groups may comprise decoding order data identifying the sequence identifier associated with each of the NAL units grouped in the media data group.

Each of the plurality of media data groups may be contained in a separate file, and each media data group identifier may be a filename of the file corresponding to the respective media data group.

At least a subset of the plurality of media data groups may be contained in a single file and each media data group identifier for the subset may identify a track number corresponding to the respective media data group in the single file.

In another broad aspect, there is provided a system for delivering media content, comprising a server, the server configured to provide a plurality of network abstraction layer (NAL) units representing a scalable media presentation, each NAL unit being associated with one layer of a plurality of layers; group the plurality of NAL units into a plurality of media data groups, each media data group corresponding to only one layer of the plurality of layers for a specific time period of the scalable media presentation; provide a server index comprising a plurality of server index entries, each server index entry corresponding to only one of the plurality of media data groups and comprising a media data group identifier for identifying the corresponding media data group, a quality identifier for identifying a quality level of the corresponding media data group and a layer identifier for identifying the layer associated with the corresponding media data group; a client, the client configured to: receive a client index, the client index comprising a plurality of client index entries, each client index entry corresponding to only one of the server index entries determine a desired quality level for the specific time period of the scalable media presentation, based at least on an available bandwidth metric; based on the client index, determine a subset of the plurality of layers required to reproduce the scalable media presentation at the desired quality level; generate at least one media request corresponding to the subset of the plurality of layers, each of the at least one media request comprising a scalable media presentation identifier for identifying the scalable media presentation, a requested quality identifier and a requested layer identifier; transmit the at least one media request to the server; and wherein the server is further configured to, for each at least one media request: determine a requested index entry in the plurality of server index entries based on the scalable media presentation identifier, the requested quality identifier and the requested layer identifier; identify a requested media data group based on the media data group identifier of the requested index entry; and transmit the requested media data group to the client.

Each of the plurality of NAL units in the specific time period may have a sequence identifier associated therewith for identifying the decoding order of each NAL unit within the plurality of NAL units, and each of the media data groups may comprise decoding order data identifying the sequence identifier associated with each of the NAL units grouped in the media data group.

In some embodiments, the subset of the plurality of layers may comprise a plurality of layers, and the client may be further configured to receive the requested media data groups corresponding to the plurality of layers; extract the decoding order data from the requested media data groups for each NAL unit contained in the requested media data groups; reorder the NAL units according to the decoding order data; and decode the NAL units in the order specified in the decoding order data.

In another broad aspect, there is provided a method for receiving media content from a server by a client, comprising receiving a client index, the client index comprising a plurality of client index entries, each client index entry corresponding to only one of a plurality of media data groups, each of the media data groups corresponding to only one layer of a plurality of layers for a specific time period of a scalable media presentation, each of the plurality of layers being represented by a plurality of network abstraction layer (NAL) units associated with the layer, wherein each client index entry comprises a media data group identifier for identifying the corresponding media data group, a quality identifier for identifying a quality level of the corresponding media data group and a layer identifier for identifying the layer associated with the corresponding media data group; determining a desired quality level for the specific time period of the scalable media presentation, based at least on an available bandwidth metric; based on the client index, determining a subset of the plurality of layers required to reproduce the scalable media presentation at the desired quality level; generating at least one media request corresponding to the subset of the plurality of layers, each of the at least one media request comprising a scalable media presentation identifier for identifying the scalable media presentation, a requested quality identifier and a requested layer identifier; and transmitting the at least one media request to the server. The method may further comprise, prior to receiving the client index, transmitting an initial request to the server.

The subset of the plurality of layers may comprise a plurality of layers, and wherein the client may be further configured to receive the requested media data groups corresponding to the plurality of layers; extract the decoding order data from the requested media data groups for each NAL unit contained in the requested media data groups; reorder the NAL units according to the decoding order data; and decode the NAL units in the order specified in the decoding order data.

Further aspects and advantages of the embodiments described herein will appear from the following description taken together with the accompanying drawings.

DRAWINGS

For a better understanding of embodiments of the systems and methods described herein, and to show more clearly how they may be carried into effect, reference will be made, by way of example, to the accompanying drawings in which.

Figure 1:
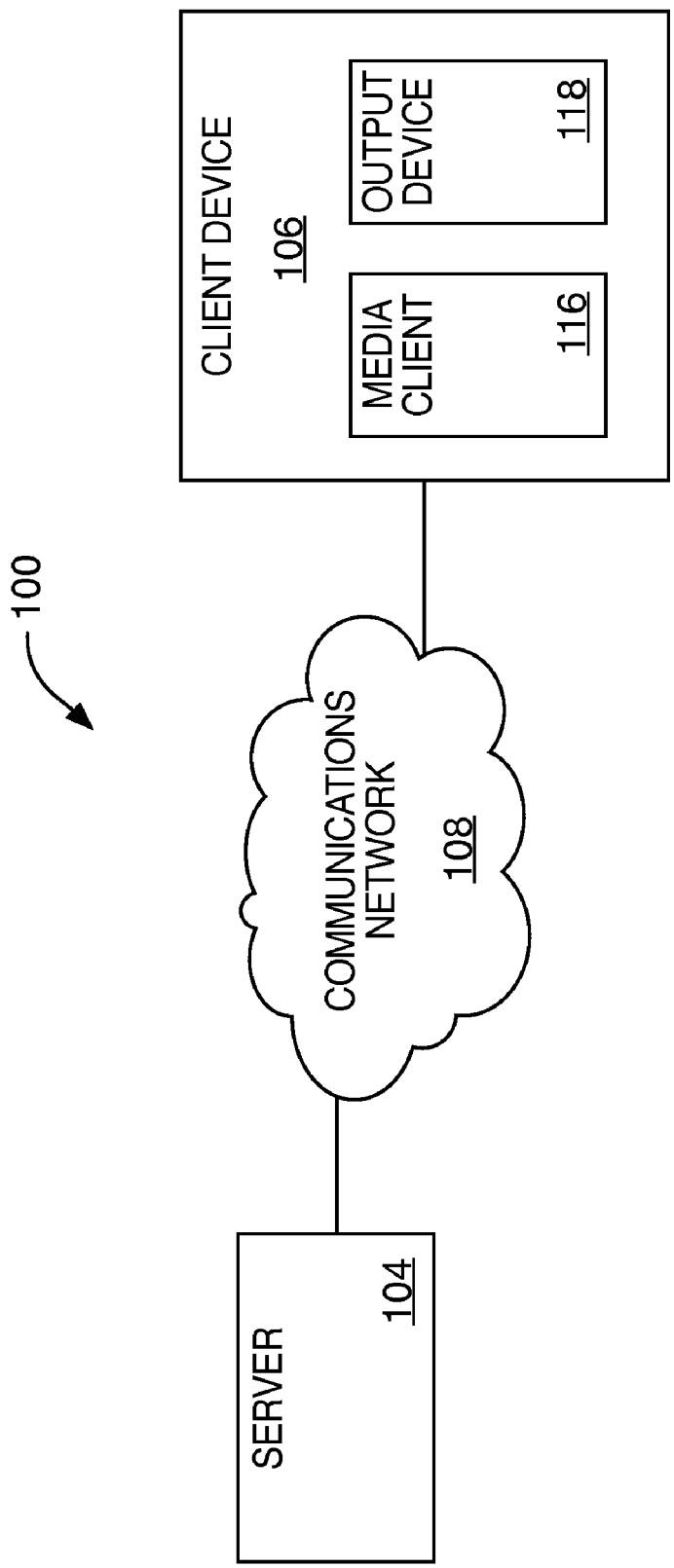
FIG. 1 is a block diagram of an exemplary system for transmitting and receiving scalable media presentations.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Embodiments described herein relate to methods and systems for the transmission and reception of scalable media files using a chunking model. Specifically, a plurality of network abstraction layer (NAL) units representing a scalable media presentation are grouped into a plurality of video chunks wherein each chunk represents only the NAL units of one layer and a specific time period. The plurality of video chunks are then stored in one or more scalable media files along with indexing information for retrieving the NAL units from each video chunk. In this manner, a client can request only the video chunks (and thus NAL units) that it needs or wants to achieve a specific quality level. In some cases, the quality level may be expressed as a bitrate or bandwidth. The bitrate may generally be an average bitrate, although a minimum or peak bitrate may also be specified.

Reference is made to FIG. 1, which illustrates an exemplary system 100 for transmitting and receiving scalable media presentations. The system 100 comprises a server 104 and a client device 106 connected by a communications network 108. While the system 100 is shown in FIG. 1 with a single server 104 and a single client device 106, the system 100 may include multiple servers 104 and/or client devices 106.

The server 104 can store a plurality of data units 110 representing at least a portion of a scalable media presentation. The data units 110 can be grouped into a plurality of chunks where each chunk represents the data units 110 for a specific time period. The server 104 can then store the chunks in one or more scalable media files 112. The scalable media presentation may be a scalable video encoded using scalable video coding (SVC), or any other scalable media presentation such as a scalable audio presentation, or a scalable video encoded using any other encoding standard. A media presentation is considered to be scalable when data units of the media presentation can be removed in a way that the remaining data units form another valid media presentation for a receiving device, and the remaining data units form a lower quality representation of the original media presentation than that of the complete media presentation. Non-scalable media presentations are often referred to as single-layer media presentations.

SVC is an extension of the H.264/MPEG-4 AVC video compression standard. When a raw video is SVC encoded, it may be encoded into one or more layers, of differing quality. The layer with the lowest quality, referred to as the base layer, contains the most important part of the video stream. One or more enhancement layers may then be encoded to further refine the quality of the base layer. The enhancement layers can be used to improve the spatial resolution (picture size), temporal resolution (frame rate), and the SNR (signal to noise ratio) quality of the base layer and/or intermediate layers. For example, a video that has been encoded with SVC may have ten layers (numbered 0 to 9) as shown in Table 1.

TABLE 1

| Layer | Resolution | Framerate | Bitrate | DID, TID, QID |
|---|---|---|---|---|
| 0 (Base Layer) | 176 × 144 | 7.5 | 111.6 | (0, 0, 0) |
| 1 | 176 × 144 | 15 | 137.8 | (0, 1, 0) |
| 2 | 176 × 144 | 7.5 | 115.4 | (0, 0, 1) |
| 3 | 176 × 144 | 15 | 143.0 | (0, 1, 1) |
| 4 | 352 × 288 | 7.5 | 566.4 | (1, 0, 0) |
| 5 | 352 × 288 | 15 | 697.3 | (1, 1, 0) |
| 6 | 352 × 288 | 30 | 819.7 | (1, 2, 0) |
| 7 | 352 × 288 | 7.5 | 582.7 | (1, 0, 1) |
| 8 | 352 × 288 | 15 | 716.0 | (1, 1, 1) |
| 9 | 352 × 288 | 30 | 842.8 | (1, 2, 1) |

An SVC encoded video stream is organized into NAL (Network Abstraction Layer) units. Each NAL unit has a DTQ value that represents a layer number. The DTQ is comprised of a dependency ID (DID), a temporal ID (TID) and a quality ID (QID). The DID denotes the inter-layer dependency hierarchy. The TID indicates the temporal layer (or frame rate) of the NAL unit. Generally a lower TID indicates a lower frame rate. The QID designates the quality level of the NAL unit.

In some embodiments, the scalable media presentation can be an SVC-encoded video and the received data units can be NAL units. For example, the NAL units can be grouped into a plurality of video chunks where each video chunk represents only those NAL units of a specific layer (i.e. DTQ value) for a specific time period. There may also be a plurality of audio samples corresponding to the SVC video, which may be grouped into a plurality of audio chunks where each audio chunk represents only those audio samples of a specific time period.

In addition to grouping the data units 110 (i.e. NAL units and/or audio samples) into a plurality of video and/or audio chunks, the server can store metadata for the video and/or audio chunks. The metadata can provide information to assist the server 104 (or, in some cases, client device 106) in extracting the plurality of NAL units and/or audio samples from each video or audio chunk. Likewise, it may provide information to the server 104 (or client device 106) for retrieving the video and/or audio chunks from the one or more scalable media files.

Data units can be grouped into video and/or audio chunks, and stored in one or more scalable media files. The one or more scalable media files can be stored on server 104 where they can be retrieved on-demand by a client device 106. In some cases, data units (NAL units and/or audio samples) can be extracted from other scalable media files that have already been created in an existing scalable format (i.e. SVC) and reorganized into one or more scalable media files. This can be done, for example, to accommodate grouping the data units according to layer, time period, quality level, or the like.

Server 104 may be implemented in hardware or software, or a combination of both. However, preferably, server 104 is implemented in computer programs executing on programmable computers each comprising at least one processor, a data storage system (including volatile and non-volatile memory and/or storage elements), at least one input device, and at least one output device. For example and without limitation, the programmable computers may be a rack server, personal computer or laptop. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, server 104 is capable of being distributed in a computer program product comprising a physical computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

In some embodiments, the server 104 is a HTTP (Hypertext Transfer Protocol) server (also known as a web server), such as Microsoft™ Internet Information Services (IIS). In particular, the server 104 may be configured to support Microsoft™ Smooth Streaming.

The server 104 can receive the one or more scalable media files 112 generated by a file creation module and store them in memory so that the scalable media files 112 can be transferred to the client device 106 on-demand. Typically the server 104 receives a request for a specific scalable media presentation from the client device 106. The server 104 then obtains the retrieval information for the scalable media presentation and transmits it to the client device 106. The client device 106 then uses the retrieval information to determine which video and/or audio chunks it wants to retrieve. The client device 106 then sends the server 104 a request for one or more video and/or audio chunks. Upon receiving the request, the server 104 retrieves the requested video and/or audio chunks from the one or more scalable media files 112 and transmits them to the client device 106.

The process then repeats until the client device 106 has retrieved the entire scalable media presentation or the client device 106 no longer wishes to view or listen to the scalable media presentation. Specifically, the client device 106 uses the retrieval information to select the next video and/or audio chunks to retrieve, and then the client requests the selected video and/or audio chunks. Upon receiving the request, the server 104 retrieves the requested video and/or audio chunks from the one or more scalable media files and transmits them to the client device 106.

In contrast to other servers, rather than creating a different file for each time domain, an IIS server configured to support Smooth Streaming typically provides a single file for each supported bitrate (bandwidth). The single file may be, for example, an ISO MP4 container and ISO MP4 movie fragments may be specified within the file to create time based chunks. This reduces the number of required files from one file per bitrate per time domain, to one file per bitrate. For a long media presentation, the savings in number of files may be significant.

A Smooth Streaming media client can be configured to request a specific time domain and desired bitrate using an appropriately structured URL. Based on the URL, IIS can determine the bitrate and time domain desired by the client, and extract the appropriate data from the appropriate file for delivery to the client.

In order to support Smooth Streaming requests, an IIS server can be configured to use a number of different file types. In particular, there may be a client manifest file, a server manifest file and one or more media files.

The client manifest file may be a provided in a markup language, such as Extensible Markup Language (XML), and typically has a file extension of ".ismc". The client manifest may be requested by a media client at the beginning of a media session. It can provide information for the media client regarding parameters of the media session, such as bitrate (e.g., in bits per second), height, width, frame rate, number of chunks, chunk durations, etc. The client manifest may also contain instructions for formulating the URL request to the server. For example, the client manifest may contain a URL template, with placeholders for various parameters the media client can later specify, such as bitrate and time period.

The server manifest file may also be provided in a markup language, such as XML, and typically has a file extension of ".ism". The server manifest can be used by the IIS server to determine a specific media file (or portion of the specific media file) to provide to the client, in response to an appropriately formed URL request.

Media files may be encapsulated in an ISO MP4 container, which may have a file extension such as ".mp4" or ".ismv". Each media file may be segmented into chunks using the Movie Fragment (MOOF) characteristic of the MPEG-4 specification. Each media file may also contain a Movie Fragment Random Access (MFRA) box containing byte offsets within the file for each MOOF. Typically, a different media file is used for each bitrate of the media presentation.

An exemplary server manifest file according to a standard Smooth Streaming implementation is shown below. The server manifest file may be used by an IIS server to facilitate translation of client requests into particular media files and fragments thereof. The URL request from the client typically contains the "quality level" (which may simply be the desired bitrate).

The server manifest file may contain a path reference indicating the relative path of the media source files to be provided to clients, in association with a reference to the corresponding client manifest file. For each bitrate of the media presentation that is provided by the server, the server manifest file may contain an index entry indicating the media source file corresponding to that bitrate, the bitrate value itself (e.g., in bits per second) and other parameters, such as a track number. An exemplary server manifest file is shown below.

```
<?xml version="1.0" encoding="utf-16"?>
<smil xmlns="http://www.w3.org/2001/SMIL20/Language">
    <head>
        <meta
            name="clientManifestRelativePath"
            content="BigBuckBunny.ismc" />
    </head>
    <body>
        <switch>
            <video
                src="BigBuckBunny_2436000.ismv"
                systemBitrate="2436000">
                <param
                    name="trackID"
                    value="2"
                    valuetype="data" />
            </video>
            <video
                src="BigBuckBunny_1636000.ismv"
                systemBitrate="1636000">
                <param
                    name="trackID"
                    value="2"
                    valuetype="data" />
            </video>
            <video
                src="BigBuckBunny_1233000.ismv"
                systemBitrate="1233000">
                <param
                    name="trackID"
                    value="2"
                    valuetype="data" />
            </video>
            <video
                src="BigBuckBunny_866000.ismv"
                systemBitrate="866000">
                <param
```

```
                    name="trackID"
                    value="2"
                    valuetype="data" />
            </video>
            <video
                src="BigBuckBunny_608000.ismv"
                systemBitrate="608000">
                <param
                    name="trackID"
                    value="2"
                    valuetype="data" />
            </video>
            <video
                src="BigBuckBunny_427000.ismv"
                systemBitrate="427000">
                <param
                    name="trackID"
                    value="2"
                    valuetype="data" />
            </video>
            <video
                src="BigBuckBunny_300000.ismv"
                systemBitrate="300000">
                <param
                    name="trackID"
                    value="2"
                    valuetype="data" />
            </video>
            <audio
                src="BigBuckBunny_2436000.ismv"
                systemBitrate="64000">
                <param
                    name="trackID"
                    value="1"
                    valuetype="data" />
            </audio>
        </switch>
    </body>
</smil>
```

An exemplary client manifest file is shown below. The client manifest may identify the targeted version of the Smooth Streaming specification and the media presentation duration. The client manifest can further provide client index information for the media presentation, which can identify one or more streams and, for each stream, the presentation type, subtype, the number of chunks in the stream and the URL template for generating client requests. A plurality of alternative quality levels or bitrates may be specified for each stream. For each alternative, a duration, a bitrate, a FourCC value, width and height may be provided. Additional information to assist the decoder at the client device may also be provided. Depending on the type of data in the stream, certain properties may be omitted. For example, width, height and FourCC may be omitted for audio streams.

```
<?xml version="1.0" encoding="utf-16"?>
<SmoothStreamingMedia
    MajorVersion="1"
    MinorVersion="0"
    Duration="5964583334">
    <StreamIndex
        Type="video"
        Subtype="WVC1"
        Chunks="10"
        Url="QualityLevels({bitrate})/Fragments(video={starttime})">
        <QualityLevel
            Bitrate="2436000"
            FourCC="WVC1"
            Width="1280"
            Height="720"
CodecPrivateData="250000010FD3BE27F1678A27F859E80450824A56DCECC00000010E5A67F840" />
        <QualityLevel
            Bitrate="1636000"
            FourCC="WVC1"
            Width="960"
            Height="544"
CodecPrivateData="250000010FD3B21DF10F8A1DF843E8045081B1ECFCD0C00000010E5A67F840" />
        <QualityLevel
            Bitrate="1233000"
            FourCC="WVC1"
            Width="848"
            Height="480"
CodecPrivateData="250000010FCBA61A70EF8A1A783BE8045081A5A05E11C00000010E5A67F840" />
        <QualityLevel
            Bitrate="866000"
            FourCC="WVC1"
            Width="624"
            Height="352"
CodecPrivateData="250000010FCB9A1370AF8A13782BE80450819A6D4211C00000010E5A67F840" />
        <QualityLevel
            Bitrate="608000"
            FourCC="WVC1"
            Width="480"
            Height="272"
CodecPrivateData="250000010FCB920EF0878A0EF821E8045081128DDCC5C00000010E5A67F840" />
        <QualityLevel
            Bitrate="427000"
            FourCC="WVC1"
            Width="424"
            Height="240"
CodecPrivateData="250000010FCB8C0D30778A0D381DE80450810D074127400000010E5A67F840" />
        <QualityLevel
            Bitrate="300000"
            FourCC="WVC1"
            Width="320"
            Height="176"
CodecPrivateData="250000010FC38809F0578A09F815E804508089275B8D400000010E5A67F840" />
        <c
            n="0"
            d="20000000" />
        <c
            n="1"
            d="20000000" />
        <c
            n="2"
            d="20000000" />
        <c
            n="3"
            d="20000000" />
        <c
            n="4"
            d="20000000" />
        <c
            n="5"
            d="20000000" />
        <c
            n="6"
            d="20000000" />
        <c
            n="7"
            d="20000000" />
        <c
            n="8"
            d="20000000" />
        <c
            n="9"
            d="20000000" />
        <c
            n="10"
            d="20000000" />
    </StreamIndex>
    <StreamIndex
        Type="audio"
```

-continued

```
        Subtype="WmaPro"
        Chunks="10"
        Url="QualityLevels({bitrate})/Fragments(audio={start time})">
        <QualityLevel
            Bitrate="64000"
WaveFormatEx="6201020044AC0000451F0000CF0510001200100003000
00000000000000000000E00042C0" />
        <c
            n="0"
            d="21362358" />
        <c
            n="1"
            d="19969161" />
        <c
            n="2"
            d="19040363" />
        <c
            n="3"
            d="20433560" />
        <c
            n="4"
            d="20433560" />
        <c
            n="5"
            d="19969161" />
        <c
            n="6"
            d="19040363" />
        <c
            n="7"
            d="21362358" />
        <c
            n="8"
            d="19765986" />
        <c
            n="9"
            d="19591837" />
        <c
            n="10"
            d="19704762" />
</StreamIndex>
</SmoothStreamingMedia>
```

Each media file may contain video data, audio data or both. Media files may be based on an MPEG-4 container format, which is typically subdivided into discrete portions or "boxes". Accordingly, each media file may have a file type and compatibility box (FTYPE), one or more movie fragment boxes for defining an audio or video segment (MOOF), one or more corresponding media data boxes for the audio or video (MDAT), a movie fragment random access box (MFRA) and a movie container box for metadata (MOOV), the latter of which may comprise a movie header (MVHD), track container for video or audio (TRAK), and a movie extends box (MVEX).

The MFRA box in a media file may contain information associating the timestamp of each MOOF box in the media file to its byte offset from the start of the file. Accordingly, if a client requests a media fragment and provides a corresponding timestamp, the server may use information in the MFRA box to determine the appropriate MOOF and MDAT box to provide, based on the desired timestamp.

Similarly, each video or audio track in a media file may have a corresponding track fragment random access box (TFRA), which may associate the timestamp of each MOOF box associated with the track to its byte offset from the start of the file. For example, a timestamp of 0 may correspond to a MOOF byte offset of 269725, indicating that the first MOOF box begins at byte offset 269725.

Figure 2:
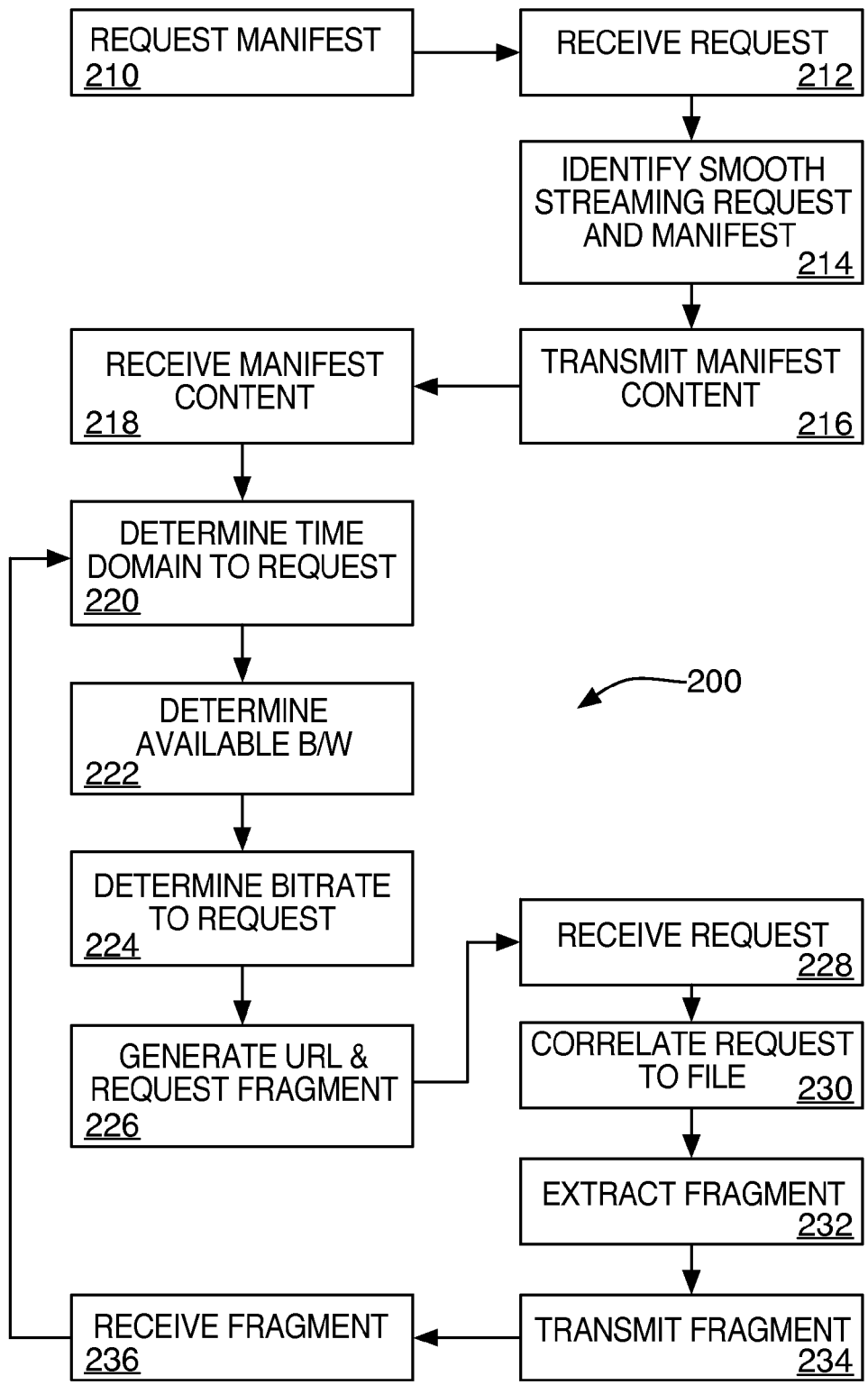
FIG. 2 is a flowchart of a method for transmitting and receiving scalable media presentations.

Referring now to FIG. 2, there is shown a flowchart of an exemplary Smooth Streaming media session 200. For the purposes of illustration, the specific example refers to the example client manifest and server manifest files described above, which correspond to a media presentation entitled "Big Buck Bunny".

The media download session between the client and server may begin with the client requesting the client manifest from the server at 210. The client may be instructed to download the client manifest by a web page, for example. Alternatively, a user may provide a URL of the client manifest manually. The client request for the client manifest may take the form of a URL, such as:

HTTP Get "/BigBuckBunny.ism/Manifest"

The server receives the request at 212 and, based on the URL, identifies that it is a Smooth Streaming request at 214. The type of the request may be determined from the extension (e.g., ".ism") and/or the "/Manifest" portion of the URL. Other known methods may also be used to invoke a Smooth Streaming request. The IIS server may invoke a media services extension to handle the Smooth Streaming request.

Based on the URL, the server retrieves the client manifest corresponding to the desired media presentation and transmits the client manifest content (e.g., the client manifest file) to the client at 216.

The client receives the client manifest at 218 and may parse the client manifest data to determine the available quality levels (e.g., bitrates), time periods, and the like.

At 220, the client determines which time period of the media presentation to request. Typically, for a video, the client may first request the video fragment corresponding to the first timestamp. That is, the client may request the data corresponding to the start of the video. Thereafter, the client may request data corresponding to subsequent time periods of the video. In some cases, the client may not request fragments in sequence. This may happen, for example, where a user directs the client to begin playback at a particular position of a media presentation.

At 222, the client may determine available bandwidth for receiving the media presentation. The client may also evaluate other factors that can affect playback ability or quality, such as processing ability, buffer size, and the like. However, in some cases, the client may not have sufficient data to assess playback factors. For example, if the media presentation has not yet begun streaming, the client may not be able to reliably assess available bandwidth.

Upon determining the desired time period to request, and optionally, upon determining available bandwidth, the client may determine which of the available bitrates specified in the client manifest to request at 224. For a first request in a media presentation, the client may typically request the lowest bitrate, since available bandwidth cannot be reliably determined. Selecting the lowest bitrate may maximize the possibility of successful retrieval and playback.

Accordingly, once the desired bitrate and time period are determined, the client may generate a request URL and request the desired fragment at 226. The generated URL for an example request may be:

HTTP Get "/BigBuckBunny.ism/QualityLevels(300000)/Fragments(video=0)"

In the above example, the generated URL contains a request for a quality level or bitrate of 300000 (bps) and a fragment beginning with timestamp 0.

The server can receive the request and parse the URL at 228 to determine the request parameters, including the requested quality level and time period. At 230, the server can interpret data in the server manifest file to associate or correlate the requested quality level or bitrate to the corresponding media file, which is specified in the server manifest as having a bitrate of 300000. In the above exemplary server manifest file, the media file corresponding to a bitrate of 300000 is named "BigBuckBunny_300000.ismv". Similarly, the IIS server can identify the requested timestamp and look up the corresponding offset for a media fragment in either the MFRA or TFRA box of the corresponding media file.

At 232, the server can extract the identified media fragment from the media file and transmit the fragment to the client at 234 in fulfillment of the client request.

The client may receive the fragment at 236, and may return to 220 to determine the next fragment to request. Typically, the next fragment requested will be the next fragment in the media sequence (e.g., the next time period). The client may proceed as before to determine a preferred bitrate for the next fragment in the sequence, based on playback factors such as available bandwidth, processing ability and the like.

If the client determines that more bandwidth is available, the client may request a higher quality level for the next fragment. For example, the next request may be:
HTTP Get"/BigBuckBunny.ism/QualityLevels(427000)/Fragments(video=2000000)"

Accordingly, the next request indicates that a fragment with a timestamp of 2000000 and a higher quality level or bitrate of 227000 (bps) is requested. Upon receiving the request from the client, the server can associate the request to a media file named "BigBuckBunny_427000.ismv" and extract the movie fragment that begins at time offset 2000000.

This process may be repeated for every fragment thereafter, until the media session is completed or terminated.

Accordingly, the client can dynamically adjust the received bitrate in response to the playback factors. However, to maintain a seamless streaming experience, the client may only change the received bitrate when requesting a new media fragment. This may negatively impact decoding and playback. For example, if available bandwidth decreases below the bitrate of a media fragment while receiving the fragment, the client may need to wait until the next request to change the received bitrate. As a result, the client may be unable to maintain uninterrupted playback of the media presentation.

For media presentations comprising both video and audio data, the client may interleave requests for audio and video fragments. Alternatively, the client may request audio fragments in parallel with video fragments. Requests for audio fragments may be generally similar to those for video fragments. For example, a request for an audio fragment may be:
HTTP Get "/BigBuckBunny.ism/QualityLevels(64000)/Fragments(audio=0)"

Upon receiving the audio fragment request, the IIS server identifies that audio data is requested, with a quality level or bitrate of 64000 and a time offset of 0. From the server manifest file, the server can determine that the requested audio data is in the file "BigBuckBunny_2436000.ismv".

An example communication exchange between a client and server during a Smooth Streaming session is shown below:

```
Client → HTTP Get /BigBuckBunny.ism/Manifest
Server → HTTP OK - provides content of BigBuckBunny.ismc
Client → HTTP Get
  /BigBuckBunny.ism/QualityLevels(300000)/Fragments(video=0)
Client → HTTP Get
  /BigBuckBunny.ism/QualityLevels(64000)/Fragments(audio=0)
Server → HTTP OK - provides first video fragment from
  content of BigBuckBunny_300000.ismv
Server → HTTP OK - provides first audio fragment from
  content of BigBuckBunny_2436000.ismv
Client → HTTP Get
```

-continued
```
  /BigBuckBunny.ism/QualityLevels(427000)/Fragments(video=2000000)
Client → HTTP Get
  /BigBuckBunny.ism/QualityLevels(64000)/Fragments(audio=2136358)
Server → HTTP OK - provides second video fragment from
  content of BigBuckBunny_427000.ismv
Server → HTTP OK - provides second audio fragment from
  content of BigBuckBunny_2436000.ismv
Client → HTTP Get
  /BigBuckBunny.ism/QualityLevels(300000)/Fragments(video=4000000)
Client → HTTP Get
  /BigBuckBunny.ism/QualityLevels(64000)/Fragments(audio=4133519)
Server → HTTP OK - provides third video fragment from
  content of BigBuckBunny_300000.ismv
Server → HTTP OK - provides third audio fragment from
  content of BigBuckBunny_2436000.ismv
```

In the foregoing example, the media presentation must be encoded multiple times: once for each bitrate to be offered to clients. In operation the client can only change the bitrate—for example, in response to changing bandwidth or playback conditions—when requesting a new fragment. This is because the model underlying current systems is to take a video file and create several versions of it that represent different bandwidths or bitrates. The multiple files may then be split into a number of chunks representing a specific time frame, for example a chunk for every 5 seconds of video. When a client wants to receive video, it determines which chunk to download based on the various factors described above. In this manner the stream adapts dynamically to the available bandwidth as the client can pick a specific file for each time chunk.

The concept of chunking (or fragmentation) described above can be extended to support a more flexible streaming solution.

As the name implies, Scalable Video Coding facilitates the provision of multiple different quality levels or bitrates from a single media presentation. Use of SVC enables the creation of a chunk model in which each of the SVC layers can be placed in different chunks.

In a scalable chunk model, rather than define a media file per bitrate as above, there may be a media file for each layer. In some cases, there may simply be tracks in a media file for each layer. That is, rather than providing multiple independent chunks for each time domain, each representing a different bitrate, the scalable chunk model may use multiple layers of chunks for each time domain. Accordingly, the client can select the layers it wishes to receive by requesting multiple different chunks, each representing particular layers, for each time period.

Accordingly, each media fragment may contain only SVC NAL units for a specific layer.

When a specific target bitrate is desired at the client, the client can determine which enhancement layers to request to achieve the target bitrate. The client can generate multiple requests to retrieve all the layers required to achieve the target bitrate. Once the base layer and the necessary enhancement layers are received, the client can assemble all the NAL units from each layer into a decoding order, before providing the data to the decoder. Although similar principles can be applied to audio, in general audio data may simply be processed in a similar manner as current Smooth Streaming solutions.

Significantly, when using the scalable chunk model, if a client fails to receive higher level layers, the video presentation can still be decoded and played back without interruption, although at a lower quality level.

The transmission model behind scalable chunking is similar to that of current chunking models. That is, the media client may request chunks using standard HTTP requests for receiving files.

By default, the Microsoft™ Smooth Streaming system is not configured to support delivery of SVC media presentations that take advantage of SVC layers. However, SVC is an extension of MPEG-4/AVC and shares similar metadata and file structures. Accordingly, an IIS server and Smooth Streaming services can be adapted to support SVC media content with modifications to exploit current specifications for configuration files, such as the server and client manifest files. For example, an unmodified IIS server with support for Smooth Streaming can be configured to deliver SVC media presentations using the scalable chunking model by using suitably crafted configuration files, so that the server treats the SVC media presentation in the same manner as it would an ordinary AVC media presentation. That is, the IIS server need not be aware that it is delivering SVC content instead of AVC content.

Accordingly, a client modified to support scalable chunking and SVC decoding can interact with an unmodified, but suitably configured, Smooth Streaming server to receive SVC media presentations using the scalable chunking model.

A scalable media presentation client manifest file may be generally similar to the standard client manifest file. However, in some cases, multiple layers may have identical bitrates. Accordingly, to allow the client to more clearly distinguish among desired layers, a custom attribute or layer identifier may be defined in the client manifest to uniquely distinguish each layer.

An exemplary scalable media presentation client manifest file is shown below. The scalable media presentation client manifest may identify the targeted version of the Smooth Streaming specification and the media presentation duration. The scalable media presentation client manifest can further provide a client index for the media presentation, which can identify one or more streams and, for each stream, the presentation type, subtype, the number of chunks in the stream and the URL template for generating client requests. A plurality of layers may be specified for each fragment. For each layer, a duration, a bitrate, a FourCC value, width and height may be provided. Additional information to assist the decoder at the client device may also be provided. Depending on the type of data in the stream, certain properties may be omitted. For example, width, height and FourCC may be omitted for audio streams. Additionally, a custom attribute may be defined, which specifies the SVC layer for each stream.

```
<?xml version="1.0" encoding="utf-8"?>
<SmoothStreamingMedia MajorVersion="2" MinorVersion="0"
Duration="5962500000">
    <StreamIndex Type="video" Name="video" Subtype="SVC1"
Timescale="10000000" QualityLevels="10"
Url="QualityLevels({bitrate},{CustomAttributes})/Fragments(
video={start time})" MaxWidth="1280" MaxHeight="720"
Chunks="217">
        <QualityLevel Index="0" Bitrate="111600" FourCC="SVC1"
MaxWidth="176" MaxHeight="144" CodecPrivateData="FFFF0000">
            <CustomAttributes>
                <Attribute Name="SVC_Layer" Value="0"/>
            </CustomAttributes>
        </QualityLevel>
        <QualityLevel Index="1" Bitrate="137800" FourCC="SVC1"
MaxWidth="176" MaxHeight="144" CodecPrivateData="FFFF0000">
```

-continued

```
            <CustomAttributes>
                <Attribute Name="SVC_Layer" Value="1"/>
            </CustomAttributes>
        </QualityLevel>
        <QualityLevel Index="2" Bitrate="115400" FourCC="SVC1"
MaxWidth="176" MaxHeight="144" CodecPrivateData="FFFF0000">
            <CustomAttributes>
                <Attribute Name="SVC_Layer" Value="2"/>
            </CustomAttributes>
        </QualityLevel>
        <QualityLevel Index="3" Bitrate="143000" FourCC="SVC1"
MaxWidth="176" MaxHeight="144" CodecPrivateData="FFFF0000">
            <CustomAttributes>
                <Attribute Name="SVC_Layer" Value="3"/>
            </CustomAttributes>
        </QualityLevel>
        <QualityLevel Index="4" Bitrate="566400" FourCC="SVC1"
MaxWidth="352" MaxHeight="288" CodecPrivateData="FFFF0000">
            <CustomAttributes>
                <Attribute Name="SVC_Layer" Value="4"/>
            </CustomAttributes>
        </QualityLevel>
        <QualityLevel Index="5" Bitrate="697300" FourCC="SVC1"
MaxWidth="352" MaxHeight="288" CodecPrivateData="FFFF0000">
            <CustomAttributes>
                <Attribute Name="SVC_Layer" Value="5"/>
            </CustomAttributes>
        </QualityLevel>
        <QualityLevel Index="6" Bitrate="819700" FourCC="SVC1"
MaxWidth="352" MaxHeight="288" CodecPrivateData="FFFF0000">
            <CustomAttributes>
                <Attribute Name="SVC_Layer" Value="6"/>
            </CustomAttributes>
        </QualityLevel>
        <QualityLevel Index="7" Bitrate="582700" FourCC="SVC1"
MaxWidth="352" MaxHeight="288" CodecPrivateData="FFFF0000">
            <CustomAttributes>
                <Attribute Name="SVC_Layer" Value="7"/>
            </CustomAttributes>
        </QualityLevel>
        <QualityLevel Index="8" Bitrate="716000" FourCC="SVC1"
MaxWidth="352" MaxHeight="288" CodecPrivateData="FFFF0000">
            <CustomAttributes>
                <Attribute Name="SVC_Layer" Value="8"/>
            </CustomAttributes>
        </QualityLevel>
        <QualityLevel Index="9" Bitrate="842800" FourCC="SVC1"
MaxWidth="352" MaxHeight="288" CodecPrivateData="FFFF0000">
            <CustomAttributes>
                <Attribute Name="SVC_Layer" Value="9"/>
            </CustomAttributes>
        </QualityLevel>
        <c d="27500000"/>
        <c d="27500000"/>
        <c d="27500000"/>
        <c d="27500000"/>
        <c d="27500000"/>
        <c d="27500000"/>
        <c d="27500000"/>
        <c d="27500000"/>
        <c d="27500000"/>
        <c d="27500000"/>
```

Similarly, the scalable media presentation server manifest file may be generally similar to the standard server manifest file. However, as noted, the case may arise where multiple layers have identical bitrates. Accordingly, a custom attribute comprising a layer identifier may be defined in the server manifest and corresponding to the client manifest custom attribute to uniquely distinguish each layer.

An exemplary server manifest file is shown below. The server manifest file may be used by a server to facilitate translation of client requests into particular media files and fragments thereof. The URL request from the client typically contains the quality level (which may simply be the desired bitrate) and a layer identifier. By examining the server manifest file, the server can determine the media source file corresponding to the request.

The server manifest file may contain a reference indicating the relative path of the media source files to be provided to clients, along with a reference to the corresponding client manifest file. For each layer of the media presentation that is provided by the server, the server manifest file may contain a media data group identifier indicating the media source file or track corresponding to that layer, a quality identifier for identifying the quality level (e.g., bitrate) of the layer and other parameters, such as a track number. As with the client manifest, a layer identifier, such as an SVC Layer parameter, may be defined to identify the SVC layer of each media data group.

```
<?xml version="1.0" encoding="utf-8"?>
<smil xmlns="http://www.w3.org/2001/SMIL20/Language">
    <head>
        <meta name="clientManifestRelativePath"
content="big_buck_bunny_720p_h264.ismc"/>
    </head>
    <body>
        <switch>
        <video src="big_buck_bunny_720p_h264_0_111600.ismv"
systemBitrate="111600">
            <param name="trackID" value="1" valuetype="data"/>
            <param name="SVC_Layer" value="0"
valuetype="data"/>
        </video>
        <video src="big_buck_bunny_720p_h264_1_137800.ismv"
systemBitrate="137800">
            <param name="trackID" value="1" valuetype="data"/>
            <param name="SVC_Layer" value="1"
valuetype="data"/>
        </video>
        <video src="big_buck_bunny_720p_h264_2_115400.ismv"
systemBitrate="115400">
            <param name="trackID" value="1" valuetype="data"/>
            <param name="SVC_Layer" value="2"
valuetype="data"/>
        </video>
        <video src="big_buck_bunny_720p_h264_3_143000.ismv"
systemBitrate="143000">
            <param name="trackID" value="1" valuetype="data"/>
            <param name="SVC_Layer" value="3"
valuetype="data"/>
        </video>
        <video src="big_buck_bunny_720p_h264_4_566400. ismv"
systemBitrate="566400">
            <param name="trackID" value="1" valuetype="data"/>
            <param name="SVC_Layer" value="4"
valuetype="data"/>
        </video>
        <video src="big_buck_bunny_720p_h264_5_697300.ismv"
systemBitrate="697300">
            <param name="trackID" value="1" valuetype="data"/>
            <param name="SVC_Layer" value="5"
valuetype="data"/>
        </video
        <video src="big_buck_bunny_720p_h264_6_819700.ismv"
systemBitrate="819700">
            <param name="trackID" value="1" valuetype="data"/>
            <param name="SVC_Layer" value="6"
valuetype="data"/>
        </video>
        <video src="big_buck_bunny_720p_h264_7_582700.ismv"
systemBitrate="582700">
            <param name="trackID" value="1" valuetype="data"/>
            <param name="SVC_Layer" value="7"
valuetype="data"/>
        </video>
        <video src="big_buck_bunny_720p_h264_8_716000.ismv"
systemBitrate="716000">
            <param name="trackID" value="1" valuetype="data"/>
            <param name="SVC_Layer" value="8"
```

-continued

```
valuetype="data"/>
        </video>
        <video src="big_buck_bunny_720p_h264_9_842800.ismv"
systemBitrate="842800">
            <param name="trackID" value="1" valuetype="data"/>
            <param name="SVC_Layer" value="9"
valuetype="data"/>
        </video>
        <audio src="big_buck_bunny_720p_h264_0_111600.ismv"
systemBitrate="64000">
            <param name="trackID" value="2" valuetype="data"/>
        </audio>
        </switch>
    </body>
</smil>
```

In some embodiments, rather than generating a separate media file for each SVC layer, a media file may be generated that contains a separate track for each SVC layer. In this alternate, multiple track model, each media file may contain one or more video tracks. The media file may also contain audio tracks. In some cases, multiple media files may be used and the tracks divided among the media files. Each of these tracks can represent a specific SVC layer, and the MDAT box associated with each layer may contain only the SVC NAL units for that layer.

An exemplary scalable media presentation server manifest file for the alternate, track model is shown below. It can be seen that each entry refers to the same media file (e.g., big_buck_bunny_720p_h264_0_842800.ismv), and has a "trackID" parameter, which defines the track of the specific SVC layer referenced in the entry. Accordingly, only one media file may be needed for the entire SVC media presentation.

```
<?xml version="1.0" encoding="utf-8"?>
<smil xmlns="http://www.w3.org/2001/SMIL20/Language">
    <head>
        <meta name="clientManifestRelativePath"
content="big_buck_bunny_720p_h264.ismc"/>
    </head>
    <body>
        <switch>
        <video src="big_buck_bunny_720p_h264_0_842800.ismv"
systemBitrate="111600">
            <param name="trackID" value="2" valuetype="data"/>
            <param name="SVC_Layer" value="0"
valuetype="data"/>
        </video>
        <video src="big_buck_bunny_720p_h264_1_842800.ismv"
systemBitrate="137800">
            <param name="trackID" value="3" valuetype="data"/>
            <param name="SVC_Layer" value="1"
valuetype="data"/>
        </video>
        <video src="big_buck_bunny_720p_h264_2_842800.ismv"
systemBitrate="115400">
            <param name="trackID" value="4" valuetype="data"/>
            <param name="SVC_Layer" value="2"
valuetype="data"/>
        </video>
        <video src="big_buck_bunny_720p_h264_3_842800.ismv"
systemBitrate="143000">
            <param name="trackID" value="5" valuetype="data"/>
            <param name="SVC_Layer" value="3"
valuetype="data"/>
        </video>
        <video src="big_buck_bunny_720p_h264_4_842800.ismv"
systemBitrate="566400">
            <param name="trackID" value="6" valuetype="data"/>
            <param name="SVC_Layer" value="4"
```

-continued

```
          valuetype="data"/>
      </video>
      <video src="big_buck_bunny_720p_h264_5_842800.ismv"
systemBitrate="697300">
          <param name="trackID" value="7" valuetype="data"/>
          <param name="SVC_Layer" value="5"
valuetype="data"/>
      </video>
      <video src="big_buck_bunny_720p_h264_6_842800.ismv"
systemBitrate="819700">
          <param name="trackID" value="8" valuetype="data"/>
          <param name="SVC_Layer" value="6"
valuetype="data"/>
      </video>
      <video src="big_buck_bunny_720p_h264_7_842800.ismv"
systemBitrate="582700">
          <param name="trackID" value="9" valuetype="data"/>
          <param name="SVC_Layer" value="7"
valuetype="data"/>
      </video>
      <video src="big_buck_bunny_720p_h264_8_842800.ismv"
systemBitrate="716000">
          <param name="trackID" value="10" valuetype="data"/>
          <param name="SVC_Layer" value="8"
valuetype="data"/>
      </video>
      <video src="big_buck_bunny_720p_h264_9_842800.ismv"
systemBitrate="842800">
          <param name="trackID" value="11" valuetype="data"/>
          <param name="SVC_Layer" value="9"
valuetype="data"/>
      </video>
      <audio src="big_buck_bunny_720p_h264_0_842800.ismv"
systemBitrate="64000">
          <param name="trackID" value="1" valuetype="data"/>
      </audio>
    </switch>
  </body>
</smil>
```

Relative to the media files used in standard Smooth Streaming application, the scalable presentation media files are generally similar. In particular, the basic structure of MPEG-4 boxes is similar. Each media file may contain video data, audio data or both. Media files may be based on an MPEG-4 container format, which is typically subdivided into discrete portions or "boxes". Accordingly, each media file may have a file type and compatibility box (FTYPE), a movie fragment random access box (MFRA) and a movie container box for metadata (MOOV), which may comprise a movie header (MVHD), track container for video or audio (TRAK), and a movie extends box (MVEX).

The MFRA box in a media file may contain information associating the timestamp of each MOOF box in the media file to its byte offset from the start of the file. Accordingly, if a client requests a media fragment and provides a corresponding timestamp, the IIS server may use information in the MFRA box to determine the appropriate MOOF and MDAT box to provide, based on the desired timestamp.

Similarly, each video or audio track in a media file may have a corresponding track fragment random access box (TFRA), which may associate the timestamp of each MOOF box associated with the track to its byte offset from the start of the file. For example, a timestamp of 0 may correspond to a MOOF byte offset of 269725, indicating that the first MOOF box begins at byte offset 269725.

Each media file may also contain one or more movie fragment boxes for audio or video (MOOF) and one or more corresponding media data boxes for the audio or video data (MDAT), However, the content of the MDAT boxes may be significantly different. In particular, rather than containing a complete representation of a video for a particular time domain, the MDAT boxes may contain SVC NAL units (e.g., raw video data) only for the specific layer contained in the MDAT box. MDAT boxes may also contain audio data. Regardless, multiple MDAT boxes containing video data may be necessary to decode a particular time period at a desired quality level or bitrate.

In the alternate, multiple track model, the basic file structure may be largely similar. However, the number of MOOF and MDAT boxes may increase in proportion to the number of tracks (layers) embedded in the media file.

Also, in the multiple track model, although the basic definition of the MFRA box may be unchanged, the number of TFRA boxes inside the MFRA box increases in proportion to the number of tracks. As noted above, each video or audio track in a media file may have a corresponding track fragment random access box (TFRA), which may associate the timestamp of each MOOF box associated with the track to its byte offset from the start of the file. The server may use information in the TFRA box to associate a client request that includes a timestamp with the appropriate MOOF and MDAT box.

To facilitate decoding of scalable media, a proprietary box of type UUID may be defined inside each MOOF box to provide information for the client decoder, to assist in linking the layered fragments together and sorting the NALs into decoding order. The UUID box is defined in the MPEG-4 specification to support proprietary vendor extensions without requiring a new, non-standard box.

As described above, the SVC encoding process creates a base layer and one or more enhancement layers. The layers can be encoded into a stream of NAL units in a specific order. A decoder that receives the stream of NAL units in the same order can decode and display the video. The order can be important because certain NAL units (e.g., representing enhancement layers) may have dependencies on other NAL units (e.g., base layers or other enhancement layers). Accordingly, the NAL units should be passed to the decoder in the correct order.

Accordingly, for each NAL unit or sample, the UUID box may contain information to assist a media client (e.g. media client 116) in extracting and correctly ordering the plurality of NAL units and/or audio samples from each video or audio chunk. In particular, the UUID box may contain a sequence identifier or decoding order number (DON) specifying the order in which to decode the associated NAL unit or audio sample; an offset specifying the location (e.g. byte offset) of the start of the NAL unit or audio sample in the video or audio chunk; and length information specifying the length (e.g. number of bytes) of the NAL unit or audio sample.

Figure 3:
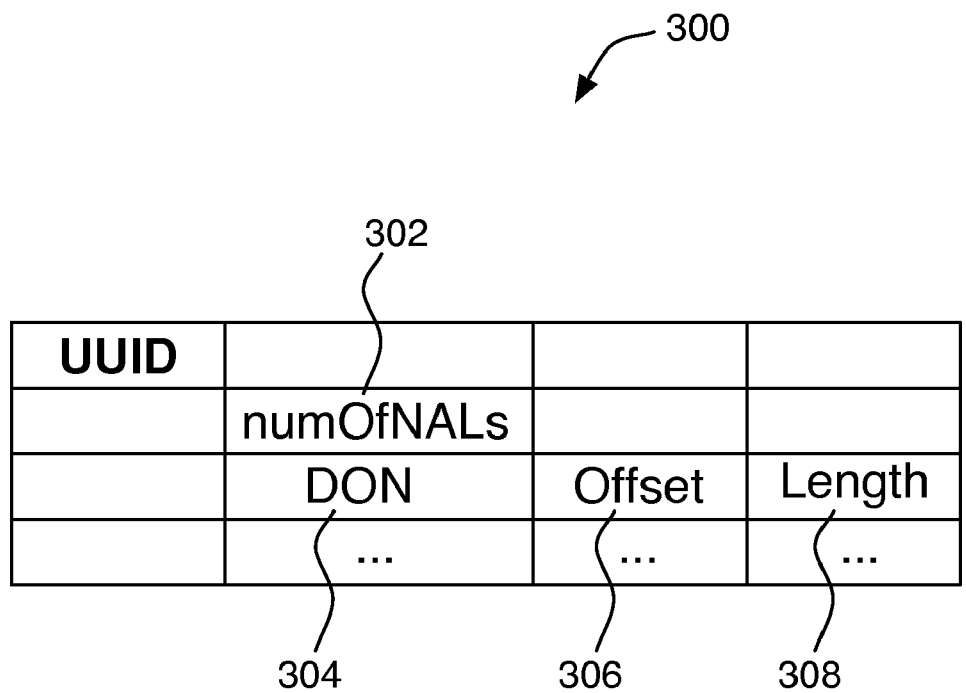
FIG. 3 is a schematic diagram illustrating the structure of indexing data.

Reference is now made to FIG. 3, which illustrates a schematic diagram illustrating the structure of indexing data that may be provided in the UUID box. The UUID data 300 comprises a number of NALs field 302, and a decoding order number (DON) field 304, an offset field 306 and a length field 308 for each NAL unit or audio sample in the video or audio chunk.

The number of NALs field 302 specifies the number of NAL units or audio samples in the corresponding video or audio chunk. In some embodiments, the number of NALs field 302 has a fixed length of 32 bits, for example.

The decoding order number (DON) field 304 specifies the order in which the associated NAL or audio sample should be decoded. There is typically one DON field 304 for each NAL unit or audio sample in the video or audio chunk. When a video is encoded by SVC, the result is a series of NAL units that must be presented to a decoder in a specific order to properly decode and display the video. Due to the fact that NAL units of certain layers depend on NAL units of lower layers, the order typically intermixes NAL units of different layers.

An exemplary SVC-encoded video stream will be described in reference to FIG. 4.

Since the NAL units themselves do not include any information about their ordering, once the NAL units are taken out of their original order (e.g. when they are sorted by layer) additional information is typically required to put the NAL units back into the appropriate order. This can be accomplished through the use of the DON field 304. The DON field 304 specifies the order in which the associated NAL unit should be decoded. The DON typically spans across all of the video chunks for a specific time period. In this manner all of the NAL units for that time period can be placed in their appropriate decoding order. In some embodiments, the DON counter is reset at the beginning of each time period so that the size of the DON field does not have to be very large. In other embodiments, the DON counter spans the entire length of the video. An exemplary set of DONs will be described in reference to FIG. 5.

The DON value can be used by the client to process fragments and arrange NAL units in the correct order for decoding. The DON value can also be used by the client to make a determination to drop certain layers and, in particular, higher level layers. If higher level layers are not received, lower levels can nevertheless be decoded successfully. Gaps in the DON are acceptable.

In some embodiments, where the audio samples represent non-scalable audio, the data 300 for each audio chunk may not contain a DON field 304 for each audio sample. For example, where the audio is non-scalable there is only one audio chunk per time period. Accordingly all of the audio samples for a particular time period can be placed in order within the audio chunk. This allows the audio samples to be placed in the correct decoding order without any additional decoding order information.

The offset field 306 identifies where within the video or audio chunk the corresponding NAL unit or audio sample begins. Typically the offset is described in terms of a byte offset. However, the offset may be described using other suitable units of measurement. In some embodiments, the offset field 306 has a fixed length of 32 bits, for example.

The length field 308 specifies the length of the associated NAL unit or audio sample. The length is typically described in bytes, but it may be described using other suitable metrics. In some embodiments, the length field 308 has a fixed length of 32 bits, for example. A media client (e.g. media client 116) can use the offset field 306 and the length field 308 to retrieve the associated NAL unit or audio sample from the video or audio chunk.

Figure 4:
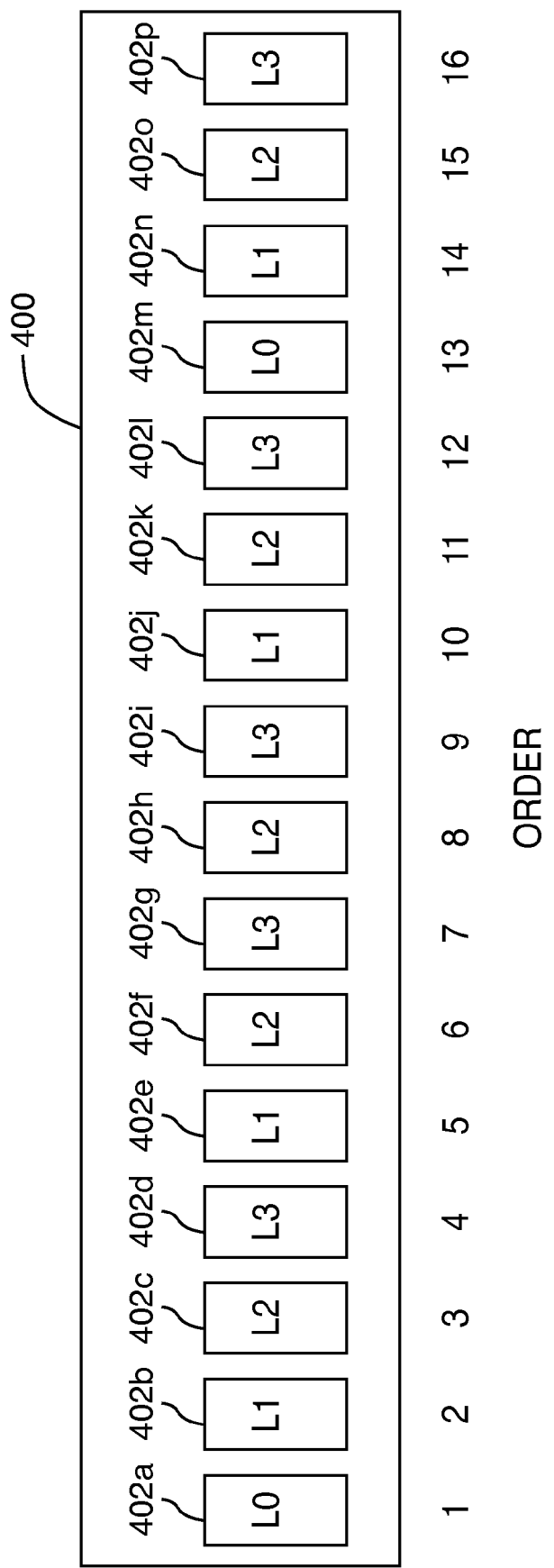
FIG. 4 is a block diagram of an SVC-encoded video stream.

Reference is now made to FIG. 4, which illustrates an exemplary SVC-encoded video stream 400 comprising sixteen NAL units 402a to 402p each associated with one of four layers (identified as L0 to L3). It can be seen that the order of the NAL units 402a to 402p is as follows L0-L1-L2-L3-L1-L2-L3-L2-L3-L1-L2-L3-L0-L1-L2-L3.

Figure 5:
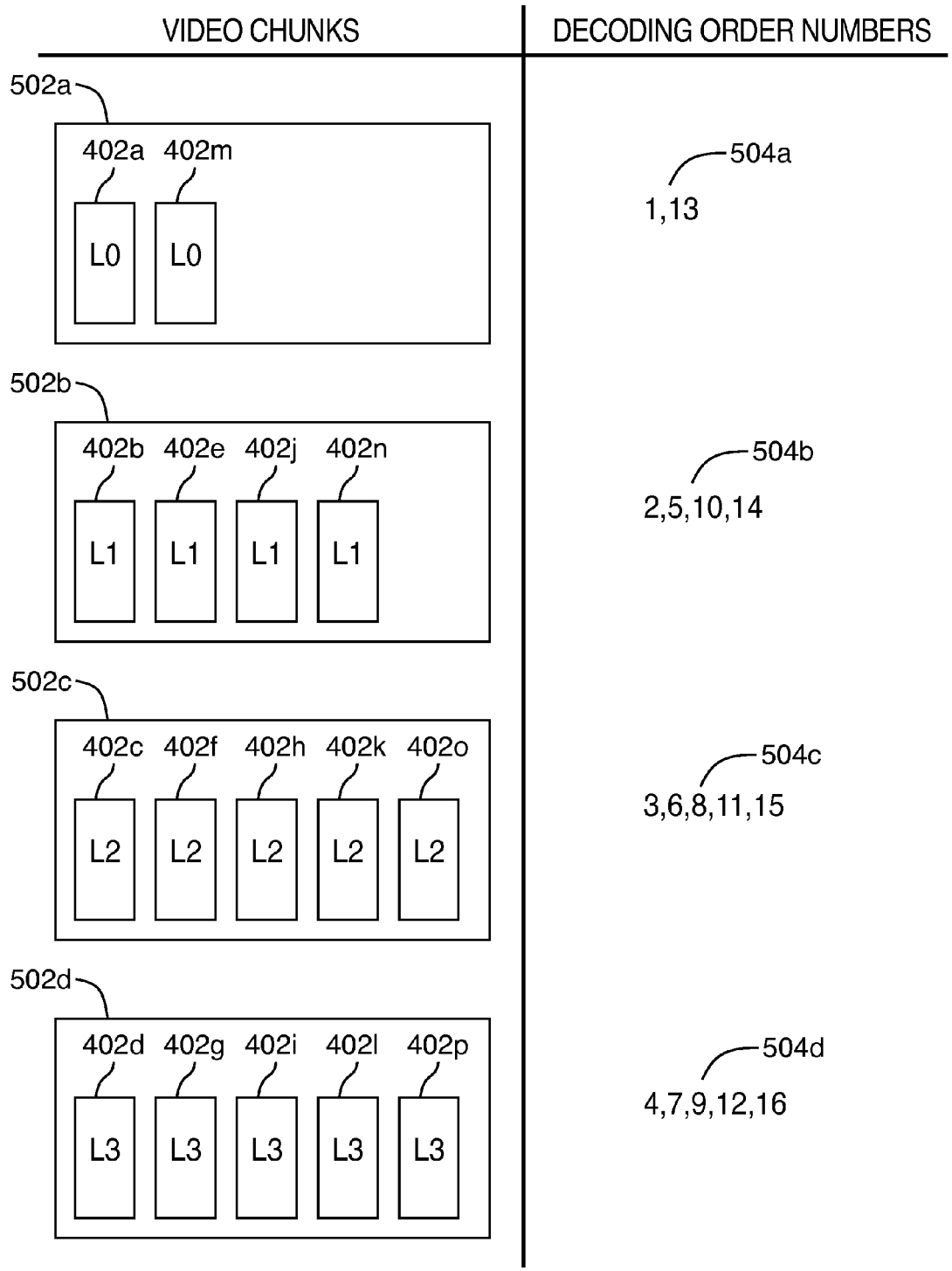
FIG. 5 is a schematic diagram illustrating a plurality of video chunks and the associated decoding order numbers.

Reference is now made to FIG. 5, which illustrates a plurality of video chunks 502a to 502d comprising the NAL units 402a to 402p of FIG. 4 and the associated DONs 504a to 504d for each video chunk 502a to 502d. It can be seen that the NAL units 402a to 402p have been sorted into a plurality of video chunks 502a to 502d, one chunk for each layer of the SVC-video. Accordingly, since there are four layers (number L0 to L3) there are four corresponding video chunks 502a to 502d. The first video chunk 502a comprises the NAL units corresponding to layer 0 (L0). We can see that the first video chunk 502a comprises only two NAL units 402a and 402m. The second video chunk 502b comprises the NAL units corresponding to layer 1 (L1). We can see that the first video chunk 502a comprises four NAL units 402b, 402e, 402j and 402n. The third video chunk 502c comprises the NAL units corresponding to layer 2 (L2). We can see that the third video chunk 502c comprises five NAL units 402c, 402f, 402h, 402k and 402o. The fourth video chunk 502d comprises the NAL units corresponding to layer 3 (L3). We can see that the fourth video chunk 502d comprises five NAL units 402d, 402g, 402i, 402l and 402p.

The DONs for each video chunk 504a to 504b can be determined from FIG. 4. Specifically, the DONs for the first video chunk 504a are 1 and 13, the DONs for the second video chunk 504b are 2, 5, 10 and 14, the DONs for the third video chunk 504c are 3, 6, 8, 11 and 15, the DONs for the fourth video chunk 504d are 4, 7, 9, 12 and 16. As described above, the DONs can be used to put the NAL units back into the original order. Since the DONs span NAL units of different layers, if the client device 106 does not retrieve all of the layers there will be gaps in the DONs. To deal with this situation the media client 116 can be configured to order the NAL units based on the DONs regardless of whether there are gaps in the DONs.

The client device 106 retrieves the video and/or audio chunks 114 of a scalable media presentation from the server 104 in the proper order and feeds the retrieved video and/or audio chunks 114 to a decoder to provide a smooth flowing presentation (i.e. video). Although embodiments are described generally herein with reference to the client device, the client device 106 may further comprise a media client 116 and an output device 118.

The media client 116 is responsible for retrieving the video and/or audio chunks 114 from the server 104, decoding them, and providing a smooth flowing presentation (i.e. video) to the output device 118.

The media client 116 may be implemented in hardware or software, or a combination of both. However, preferably, the media client 116 is implemented in computer programs executing on programmable computers each comprising at least one processor, a data storage system (including volatile and non-volatile memory and/or storage elements), at least one input device, and at least one output device. For example and without limitation, the programmable computers may be a rack server, personal computer or laptop. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the media client 116 is capable of being distributed in a computer program product comprising a physical computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Figure 6:
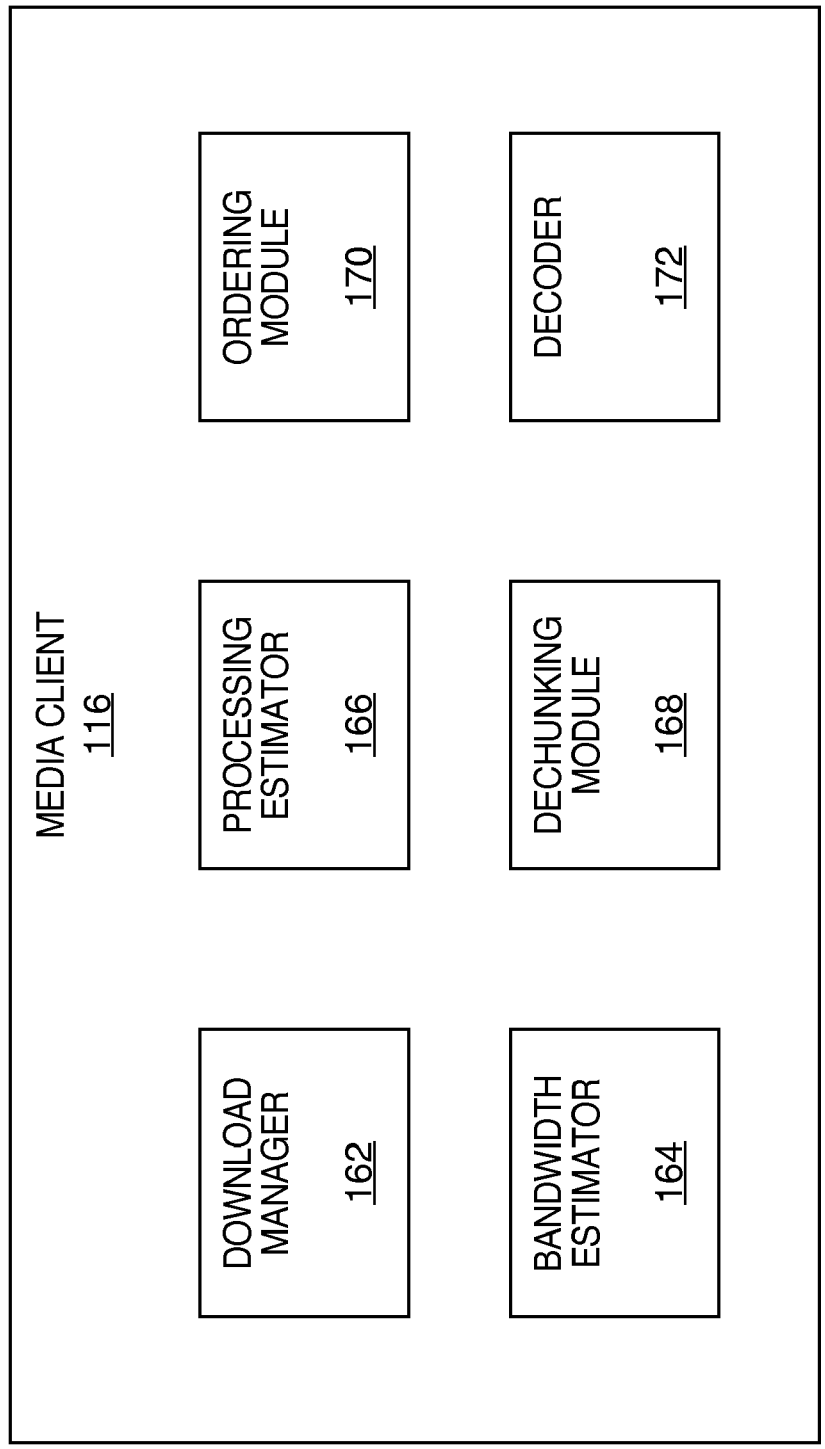
FIG. 6 is a simplified block diagram of an exemplary media client.

Referring now to FIG. 6, there is shown a simplified block diagram of an exemplary media client. Media client 116 has a download manager 162, a bandwidth estimator 164, a processing estimator 166, a dechunking module 168, an ordering module 170, and a decoder 172.

Download manager 162 can transmit and receive data over a network with other devices and systems, such as a server 104. Bandwidth estimator 164 may comprise memory buffers and timers that may be used to temporarily store media data received via download manager 162 and determine if additional data should be retrieved in a given time period, as described with reference to 222 and 722. Similarly, processing estimator 166 can be used to monitor processor (e.g., CPU) utilization to ensure that the processor is able to decode the received media content. For example, in some cases, there may be sufficient bandwidth to receive higher layers of a scalable presentation, but the processor may not have sufficient speed or capability to decode all layers, accordingly, processing estimator 166 can limit the requested quality level or limit the quality level that will be decoded. Dechunking module 168 can be used to parse MOOF and MDAT boxes in the received media data groups to extract raw NAL units that can be processed by decoder 172. Ordering module 170 can be used to sort received media data into a correct order for decoding as described with reference to FIGS. 3, 4 and 5. Decoder 172 can decode media data. The operation of media client 116 is described in greater detail herein.

In some embodiments, the functionality of the modules may be merged or further subdivided. For example, the functionality of bandwidth estimator 164 and processing estimator 166 may be performed by a single module. Likewise, the functionality of dechunking module 168 and ordering module 170 may be merged.

The output device 118 receives the decoded media presentation from the media client 116 and outputs the presentation to the user of the client device 106. In some embodiments, the output device 118 comprises a display module for displaying a video and a speaker module for outputting the audio associated with the video.

An example of a media client is Microsoft™ Windows Media Player, which may adapted to retrieve and display scalable media content using a plugin. Another example of a media client may be a web browser plugin, such as Microsoft™ Silverlight™.

The client may be configured to make determinations as to the layers to download for each time period. Moreover, the client may be configured to manage internal buffers and timers, to accommodate changes in bandwidth. Such management may occur even during the downloading of layers, in response to changing conditions.

By using a scalable media presentation, such as SVC, the client can download a base layer and optimistically begin downloading additional enhancement layers. Even if the client cannot successfully retrieve all the layers in time (either because the client estimated bandwidth incorrectly, or due to a change in available bandwidth during the download), the client can still provide a decodable stream, even with only the base layer.

For this reason, the client should download layers one at a time, beginning with the lowest (e.g., base) layer and working its way up through additional enhancement layers.

The client may have internal timers that provide download budgets. If the client determines that it cannot download all the layers required to meet the target quality level or bitrate, it may determine not to request the higher layers for that specific time period. In such situations, the client may also readjust its target quality level or bitrate for the next chunk.

Figure 7:
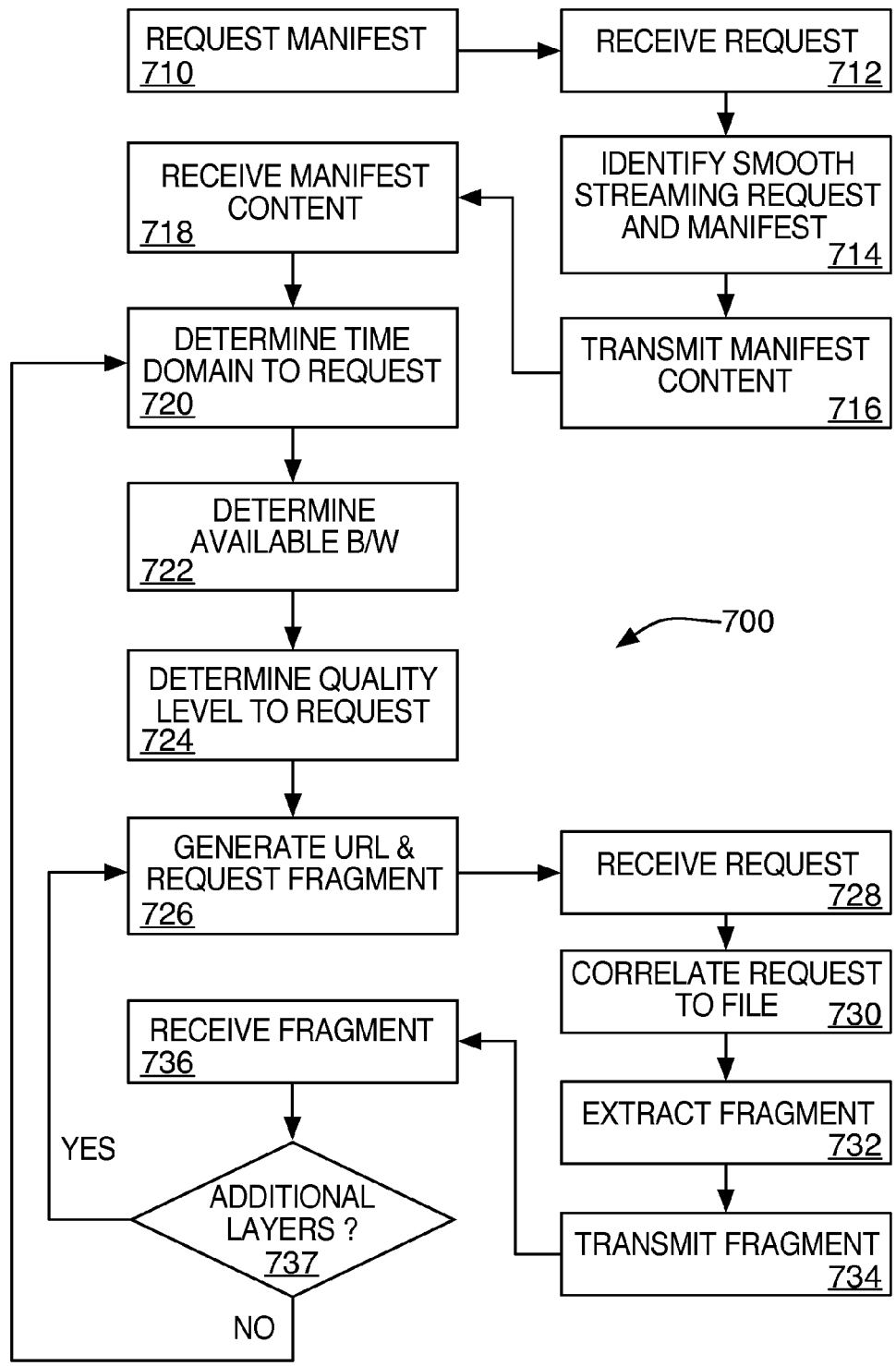
FIG. 7 is a flowchart of an exemplary method for transmitting and receiving scalable media presentations.

Referring now to FIG. 7, there is shown a flowchart of an exemplary Smooth Streaming scalable media session 700. For the purposes of illustration, the specific example refers to the example scalable media presentation client manifest and scalable media presentation server manifest files described above, which correspond to a scalable media presentation entitled "BigBuckBunny".

In general, the call model for communication between the client and server generally corresponds to the call model shown in exemplary media session 200 in FIG. 2. However, one difference is that in order to achieve a specific quality level or bitrate, which may be comprised of a base layer and one or more enhancement layers, the client can make multiple requests to the server for each time period, to retrieve a fragment for each layer that is required.

The client may request the scalable media presentation client manifest from the server at 710. The client may be instructed to download the client manifest by a web page, for example. Alternatively, a user may provide a URL of the client manifest manually. The client request for the client manifest may take the form of a URL, such as:

HTTP Get "/BigBuckBunny.ism/Manifest"

The server receives the request at 712 and, based on the URL, identifies that it is a Smooth Streaming request at 714. The type of the request may be determined from the extension (e.g., ".ism") and/or the "/Manifest" portion of the URL. Other alternatives may also be used to invoke a Smooth Streaming request. The IIS server may invoke a media services extension to handle the Smooth Streaming request.

Based on the URL, the server retrieves the client manifest corresponding to the desired media presentation and transmits the client manifest content (e.g., the client manifest file) to the client at 716.

The client receives the client manifest at 718. The client may parse the client manifest data to determine the available layers and their corresponding bitrates, time periods, and the like.

At 720, the client determines which time period of the media presentation to request. Typically, for a video, the client may first request the video fragment corresponding to the first timestamp. That is, the client may request the data corresponding to the start of the video. Thereafter, the client may request data corresponding to subsequent time periods of the video. In some cases, the client may not request fragments in sequence. This may happen, for example, where a user directs the client to begin playback at a particular position of a media presentation.

At 722, the client may determine available bandwidth for receiving the media presentation. The client may also evaluate other factors that can affect playback ability or quality, such as processing ability, buffer size, and the like. However, in some cases, the client may not have sufficient data to assess playback factors. For example, if the media presentation has not yet begun streaming, the client may not be able to reliably assess available bandwidth.

Upon determining the desired time period to request, and optionally, upon determining available bandwidth, the client may determine which quality level to target at 724. In a scalable media presentation, the quality level can be determined by selecting a base layer and one or more enhancement layers to retrieve. For a first request in a scalable media presentation, the client may typically request at least the base layer. Since available bandwidth cannot be reliably determined, the client may also request additional enhancement layers in order from the lowest level to the highest desired enhancement layer. Accordingly, if the higher level enhancement layers are not successfully received in time, the client can nevertheless decode the stream with the successfully received enhancement layers. Information regarding the successfully received streams can be used to determine available bandwidth when requesting subsequent fragments. For example, if the client successfully receives a base layer and only one enhancement layer, then in requests for subsequent fragments, the client may again request the base layer and first enhancement layer, but may not request second and third enhancement layers for the same fragment.

A scalable media presentation enables the client to overestimate available bandwidth without negatively impacting smooth playback of the presentation.

Accordingly, once the desired quality level and time period are determined, the client may generate a request URL and request the first desired layer at 726. In an exemplary session, the client determines that it has sufficient bandwidth to receive layer 7 of the scalable media presentation. In the example, layer 7 depends on layers 4 and 2 and the base layer 0.

The generated URL for an example request for the base layer may be:

HTTP Get /BigBuckBunny.ism/QualityLevels(111600, SVC_Layer=0)/Fragments(video=0)

In the above example, the generated URL contains a request for a quality level or bitrate of 111600 (bps), an SVC layer of 0 and a fragment beginning with timestamp 0.

The server can receive the request and parse the URL at 728 to determine the request parameters, including the requested quality level, SVC layer and time period. At 730, the server can interpret data in the server manifest file to associate or correlate the requested quality level or bitrate to the corresponding media data group. For example, the media data group may be contained in a media file, and may be specified in the server manifest as having a bitrate of 111600. In the above exemplary server manifest file, the media file corresponding to a bitrate of 111600 and layer 0 is named "big_buck_bunny_720p_h264_0_111600.ismv". Similarly, the IIS server can identify the requested timestamp and look up the corresponding offset for a media fragment in either the MFRA or TFRA box of the corresponding media file.

In the alternate, multiple track model, the media data group may be a track in a media file. Accordingly, the IIS server can associate the request to track 2 in the file "big_buck_bunny_720p_h264_0_842800.ismv".

At 732, the server can extract the identified media data group from the media file and transmit the fragment to the client at 734 in fulfillment of the client request.

The client may receive the fragment at 736. The client may then determine at 737 whether there is enough time and bandwidth available to retrieve the additionally targeted enhancement layers. If there is not enough time to retrieve additional layers, the client may simply render the currently retrieved layers and begin retrieving the next fragment at 720. Otherwise, the client may proceed to request the additional layers at 726, until each of the additional enhancement layers are retrieved, or until time runs out.

For example, the client may issue requests for layers 2, 4 and 7 using the following example requests:

HTTP Get /BigBuckBunny.ism/QualityLevels(115400, SVC_Layer=2)/Fragments(video=0)
HTTP Get /BigBuckBunny.ism/QualityLevels(566400, SVC_Layer=4)/Fragments(video=0)
HTTP Get /BigBuckBunny.ism/QualityLevels(582700, SVC_Layer=7)/Fragments(video=0)

It can be seen that the timestamp for each request is identical, thus corresponding to the same time period. Also, it can be seen that the client does not download all layers, but instead downloads only those layers on which layer 7 has a dependency. In this example, layer 7 depends on layers 4, 2 and 0, but does not depend on layers 6, 5, 3 or 1.

The client may also request audio data, using a conventional Smooth Streaming request. Audio data may be contained in a separate media file, or in a scalable media file.

Once the base layer and enhancement layers are retrieved, the client may return to 720 to determine the next fragment (corresponding to a new time period) to request. The client may proceed as before to determine a preferred quality level to target for the next fragment in the sequence, based on factors such as available bandwidth, processing ability and the like.

If the client determines that a different layer hierarchy should be targeted, the client may request the different layer hierarchy for the next fragment. For example, the next request may be for layer 6, which has dependencies on layers 5, 4, 1 and 0. Accordingly, the requests could be:

HTTP Get /BigBuckBunny.ism/QualityLevels(111600, SVC_Layer=0)/Fragments(video=2000)
HTTP Get /BigBuckBunny.ism/QualityLevels(137800, SVC_Layer=1)/Fragments(video=2000)
HTTP Get /BigBuckBunny.ism/QualityLevels(566400, SVC_Layer=4)/Fragments(video=2000)
HTTP Get /BigBuckBunny.ism/QualityLevels(697300, SVC_Layer=5)/Fragments(video=2000)
HTTP Get /BigBuckBunny.ism/QualityLevels(819700, SVC_Layer=6)/Fragments(video=2000)

The server can use information from the scalable server manifest file to associate the different quality levels to the different media files (or tracks within a media file in the alternate, multiple track model). As before, the IIS server can use the timestamp (e.g., video=2000) in the request to look up the time offset in the MFRA or TFRA box.

This process may be repeated for every fragment thereafter, until the media session is completed or terminated. Accordingly, the client can maximize the amount of content it receives to decode and render.

Accordingly, the client can dynamically adjust the quality level and received bitrate in response to the playback factors. Moreover, the client can maintain a seamless streaming experience even when enhancement layers are not received. That is, although the quality level may be degraded as a result of not receiving enhancement layers, the client can continue to decode and render video seamlessly.

An example communication exchange between a client and server during a scalable media presentation Smooth Streaming session is shown below:

```
Client → HTTP Get /SmoothStreaming/BigBuckBunny.ism/Manifest
Server → HTTP OK - provides content of BigBuckBunny.ismc
Client → HTTP Get
/BigBuckBunny.ism/QualityLevels(64000)/Fragments(audio=0)
Client → HTTP Get /BigBuckBunny.ism/QualityLevels(111600,
SVC_Layer=0)/Fragments(video=0)
Server → HTTP OK - provides first audio fragment from content of
big_buck_bunny_720p_h264_0_842800.ismv
Server → HTTP OK - provides first video fragment from content of
big_buck_bunny_720p_h264_0_111600.ismv
Client → HTTP Get /BigBuckBunny.ism/QualityLevels(115400,
SVC_Layer=2)/Fragments(video=0)
Server → HTTP OK - provides first video fragment from content of
big_buck_bunny_720p_h264_0_1154000.ismv
Client → HTTP Get /BigBuckBunny.ism/QualityLevels(566400,
SVC_Layer=4)/Fragments(video=0)
Server → HTTP OK - provides first video fragment from content of
big_buck_bunny_720p_h264_0_566400.ismv
Client → HTTP Get /BigBuckBunny.ism/QualityLevels(582700,
SVC_Layer=7)/Fragments(video=0)
Server → HTTP OK - provides first video fragment from content of
big_buck_bunny_720p_h264_0_582700.ismv
Client → HTTP Get
/BigBuckBunny.ism/QualityLevels(64000)/Fragments(audio=21362358)
Server → HTTP OK - provides second audio fragment from content of
big_buck_bunny_720p_h264_0_842800.ismv
Client → HTTP Get /BigBuckBunny.ism/QualityLevels(111600,
SVC_Layer=0)/Fragments(video=200)
Server → HTTP OK - provides second video fragment from content of
big_buck_bunny_720p_h264_0_111600.ismv
Client → HTTP Get /BigBuckBunny.ism/QualityLevels(137800,
SVC_Layer=1)/Fragments(video=2000)
Server → HTTP OK - provides second video fragment from content of
big_buck_bunny_720p_h264_0_137800.ismv
Client → HTTP Get /BigBuckBunny.ism/QualityLevels(566400,
SVC_Layer=4)/Fragments(video=2000)
Server → HTTP OK - provides second video fragment from content of
big_buck_bunny_720p_h264_0_566400.ismv
Client → HTTP Get /BigBuckBunny.ism/QualityLevels(697300,
SVC_Layer=5)/Fragments(video=2000)
Server → HTTP OK - provides second video fragment from content of
big_buck_bunny_720p_h264_0_697300.ismv
Client → HTTP Get /BigBuckBunny.ism/QualityLevels(819700,
SVC_Layer=6)/Fragments(video=2000)
Server → HTTP OK - provides second video fragment from content of
big_buck_bunny_720p_h264_0_819700.ismv
```

When the alternate, multiple track model is used, the server may instead retrieve fragments by extracting tracks from one media file, or relatively few media files.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method for delivering media content from a server to a client, the method comprising:
providing a plurality of network abstraction layer (NAL) units representing a scalable media presentation, each NAL unit being associated with one layer of a plurality of layers;
grouping the plurality of NAL units into a plurality of media data groups, each media data group corresponding to only one layer of the plurality of layers for a specific time period of the scalable media presentation;
providing a server index comprising a plurality of server index entries, each server index entry corresponding to only one of the plurality of media data groups and comprising a media data group identifier for identifying the corresponding media data group, a quality identifier for identifying a quality level of the corresponding media data group and a layer identifier for identifying the layer associated with the corresponding media data group;
receiving at least one media request from the client, the at least one media request comprising a scalable media presentation identifier for identifying the scalable media presentation, a requested quality identifier and a requested layer identifier; and
for each at least one media request:
determining a requested index entry in the plurality of server index entries based on the scalable media presentation identifier, the requested quality identifier and the requested layer identifier;
identifying a requested media data group based on the media data group identifier of the requested index entry; and
transmitting the requested media data group.

2. The method of claim 1, further comprising:
prior to receiving the at least one media request, receiving an initial request from the client; and
transmitting a client index to the client in response to the initial request, the client index comprising a plurality of client index entries, each client index entry corresponding to only one of the server index entries.

3. The method of claim 2, wherein each client index entry further comprises metadata for use by a scalable media presentation decoder at the client.

4. The method of claim 1, wherein each of the plurality of NAL units in the specific time period has a sequence identifier associated therewith for identifying the decoding order of each NAL unit within the plurality of NAL units, and wherein each of the media data groups comprises decoding order data identifying the sequence identifier associated with each of the NAL units grouped in the media data group.

5. The method of claim 1, wherein each of the plurality of media data groups are contained in a separate file, and each media data group identifier is a filename of the file corresponding to the respective media data group.

6. The method of claim 1, wherein at least a subset of the plurality of media data groups are contained in a single file and each media data group identifier for the subset identifies a track number corresponding to the respective media data group in the single file.

7. A method for receiving media content from a server by a client, the method comprising:
receiving a client index, the client index comprising a plurality of client index entries, each client index entry corresponding to only one of a plurality of media data groups, each of the media data groups corresponding to only one layer of a plurality of layers for a specific time period of a scalable media presentation, each of the plurality of layers being represented by a plurality of network abstraction layer (NAL) units associated with the layer, wherein each client index entry comprises a media data group identifier for identifying the corresponding media data group, a quality identifier for identifying a quality level of the corresponding media data group and a layer identifier for identifying the layer associated with the corresponding media data group;
determining a desired quality level for the specific time period of the scalable media presentation, based at least on an available bandwidth metric;

based on the client index, determining a subset of the plurality of layers required to reproduce the scalable media presentation at the desired quality level;

generating at least one media request corresponding to the subset of the plurality of layers, each of the at least one media request comprising a scalable media presentation identifier for identifying the scalable media presentation, a requested quality identifier and a requested layer identifier; and transmitting the at least one media request to the server.

8. The method of claim 7, further comprising, prior to receiving the client index, transmitting an initial request to the server.

9. The method of claim 7, wherein each of the plurality of NAL units in the specific time period has a sequence identifier associated therewith for identifying the decoding order of each NAL unit within the plurality of NAL units, and wherein each of the media data groups comprises decoding order data identifying the sequence identifier associated with each of the NAL units grouped in the media data group.

10. The method of claim 9, wherein the subset of the plurality of layers comprises a plurality of layers, and wherein the client is further configured to:

receive the requested media data groups corresponding to the plurality of layers;

extract the decoding order data from the requested media data groups for each NAL unit contained in the requested media data groups;

reorder the NAL units according to the decoding order data; and decode the NAL units in the order specified in the decoding order data.

11. A non-transitory computer-readable storage medium with an executable program stored thereon, wherein the program instructs a processor to perform a method comprising:

providing a plurality of network abstraction layer (NAL) units representing a scalable media presentation, each NAL unit being associated with one layer of a plurality of layers;

grouping the plurality of NAL units into a plurality of media data groups, each media data group corresponding to only one layer of the plurality of layers for a specific time period of the scalable media presentation;

providing a server index comprising a plurality of server index entries, each server index entry corresponding to only one of the plurality of media data groups and comprising a media data group identifier for identifying the corresponding media data group, a quality identifier for identifying a quality level of the corresponding media data group and a layer identifier for identifying the layer associated with the corresponding media data group;

receiving at least one media request from a client, the at least one media request comprising a scalable media presentation identifier for identifying the scalable media presentation, a requested quality identifier and a requested layer identifier; and for each at least one media request:

determining a requested index entry in the plurality of server index entries based on the scalable media presentation identifier, the requested quality identifier and the requested layer identifier;

identifying a requested media data group based on the media data group identifier of the requested index entry; and transmitting the requested media data group.

12. A non-transitory computer-readable storage medium with an executable program stored thereon, wherein the program instructs a processor to perform a method comprising:

receiving a client index, the client index comprising a plurality of client index entries, each client index entry corresponding to only one of a plurality of media data groups, each of the media data groups corresponding to only one layer of a plurality of layers for a specific time period of a scalable media presentation, each of the plurality of layers being represented by a plurality of network abstraction layer (NAL) units associated with the layer, wherein each client index entry comprises a media data group identifier for identifying the corresponding media data group, a quality identifier for identifying a quality level of the corresponding media data group and a layer identifier for identifying the layer associated with the corresponding media data group;

determining a desired quality level for the specific time period of the scalable media presentation, based at least on an available bandwidth metric;

based on the client index, determining a subset of the plurality of layers required to reproduce the scalable media presentation at the desired quality level;

generating at least one media request corresponding to the subset of the plurality of layers, each of the at least one media request comprising a scalable media presentation identifier for identifying the scalable media presentation, a requested quality identifier and a requested layer identifier; and transmitting the at least one media request to a server.

* * * * *